(12) United States Patent
Obrecht et al.

(10) Patent No.: US 7,875,683 B2
(45) Date of Patent: Jan. 25, 2011

(54) PROCESS FOR THE METATHETIC DEGRADATION OF NITRILE RUBBER

(75) Inventors: Werner Obrecht, Moers (DE); Julia Maria Müller, Blaustein (DE); Oskar Nuyken, München (DE)

(73) Assignee: LANXESS Deutschland GmbH, Leverkusen (DE)

( * ) Notice: Subject to any disclaimer, the term of this patent is extended or adjusted under 35 U.S.C. 154(b) by 320 days.

(21) Appl. No.: 12/193,816

(22) Filed: Aug. 19, 2008

(65) Prior Publication Data

US 2009/0076227 A1 Mar. 19, 2009

(30) Foreign Application Priority Data

Aug. 21, 2007 (DE) .................. 10 2007 039 525

(51) Int. Cl.
*C08F 8/50* (2006.01)
(52) U.S. Cl. .............. 525/361; 525/329.3; 525/364
(58) Field of Classification Search .............. 525/329.3, 525/361, 364
See application file for complete search history.

(56) References Cited

U.S. PATENT DOCUMENTS

| | | | |
|---|---|---|---|
| 3,700,637 A | 10/1972 | Finch, Jr. .................. | 260/83.3 |
| 4,464,515 A | 8/1984 | Rempel et al. .............. | 525/338 |
| 4,503,196 A | 3/1985 | Rempel et al. .............. | 525/338 |
| 4,581,417 A | 4/1986 | Buding et al. .............. | 525/338 |
| 4,631,315 A | 12/1986 | Buding et al. .............. | 525/338 |
| 4,746,707 A | 5/1988 | Fiedler et al. .............. | 525/338 |
| 4,795,788 A | 1/1989 | Himmler et al. ............ | 525/338 |
| 4,812,528 A | 3/1989 | Rempel et al. .............. | 525/338 |
| 4,978,771 A | 12/1990 | Fiedler et al. .............. | 558/459 |
| 5,728,917 A | 3/1998 | Grubbs et al. .............. | 585/653 |
| 5,831,108 A | 11/1998 | Grubbs et al. .............. | 556/21 |
| 6,610,626 B2 | 8/2003 | Grubbs et al. .............. | 502/155 |
| 6,673,881 B2 | 1/2004 | Guerin ...................... | 526/160 |
| 6,683,136 B2 | 1/2004 | Guo et al. ................. | 525/329.3 |
| 6,780,939 B2 | 8/2004 | Guerin et al. ............. | 525/329.1 |
| 6,841,623 B2 | 1/2005 | Guerin et al. ............. | 525/230 |
| 6,867,303 B2 | 3/2005 | Grela ....................... | 548/101 |
| 7,205,424 B2 | 4/2007 | Nolan ....................... | 556/136 |
| 7,329,758 B1 | 2/2008 | Grubbs et al. .............. | 548/103 |
| 7,470,750 B2* | 12/2008 | Obrecht et al. ............ | 525/329.3 |
| 7,579,410 B2* | 8/2009 | Guerin ..................... | 525/329.1 |
| 7,662,889 B2* | 2/2010 | Obrecht et al. ............ | 525/329.3 |
| 2002/0107138 A1 | 8/2002 | Hoveyda et al. ............ | 502/152 |
| 2003/0236427 A1 | 12/2003 | Grubbs et al. .............. | 558/238 |
| 2004/0127647 A1 | 7/2004 | Ong et al. .................. | 525/191 |
| 2004/0132891 A1 | 7/2004 | Ong et al. .................. | 524/492 |
| 2004/0236029 A1* | 11/2004 | Guerin et al. ............. | 525/329.3 |
| 2007/0049699 A1 | 3/2007 | Nasreddine et al. ...... | 525/329.1 |
| 2007/0049700 A1 | 3/2007 | Obrecht et al. ............ | 525/329.1 |
| 2007/0208206 A1 | 9/2007 | Obrecht et al. ............ | 585/645 |
| 2008/0064822 A1 | 3/2008 | Obrecht et al. ............ | 525/338 |
| 2008/0090970 A1 | 4/2008 | Guerin et al. ............. | 525/329.1 |

FOREIGN PATENT DOCUMENTS

| | | |
|---|---|---|
| DE | 25 39 132 | 3/1977 |
| EP | 0 419 952 | 4/1991 |
| EP | 0 471 250 | 2/1992 |

OTHER PUBLICATIONS

Organometallics, 2001, 20, 5314-5318, Sanford, Love, Grubbs, "A Versatile Precursor for the Synthesis of New Ruthenium Olefin Metathesis Catalysts".
Angew. Chem. Int. Ed, 2002, 41, No. 21 4038-4040, Grela et al, "A Highly Efficient Ruthenium Catalyst for Metathesis Reactions".
J. Am. Chem. Soc. 1997, 119, 3887-3897, XP-002433026, "Well-Defined Ruthenium Olefin Metathesis Catalysts: Mechanism and Activity" Dias, Nguyen, Grubbs.
Inorganic Chimica Acta 359 (2006) 2910-2917; Wolfgang H. Meyer et al; "Tin and Iron halogenides as additives in ruthenium-catalyzed olefin metathesis".
ChemBioChem, 2003, 4, 1229-1231; Roberts, Konkar, and Sampson; "Comparison of Fertilinβ-Peptide-Substituted Polymers and Liposomes as Inhibitors of In Vitro Fertilization" XP-002433024.
J. Org. Chem. 2003, 68, 2020-2023; Roberts and Sampson; Increased Polymer Length of Oligopeptide-Substituted Polynorbornenes with LiCl.
Angew. Chem. Int. Ed. 2003, 42, 4592-4633, Schrock, and Hoveyda; "Molybdenum and Tungsten Imido Alkylidene Complexes as Efficient Olefin-Metathesis Catalysts".
Eur. J. Org. Chem. 2003, 963-966, Grela et al; "A Good Bargain: An Inexpensive, Air-Stable Ruthenium Metathesis Catalyst Derived from α-Asarone".
J. Org. Chem. 2004, 69, pp. 6894-6896, "Ortho- and Para-Substituted Hoveyda-Grubbs Carbenes. An improved Synthesis of Highly Efficient Metathesis Initiators".
Chem, Eur. J. 2004, 10, pp. 777-784, Nuyken, Krause, Wurst, and Buchmeiser: "Synthesis and Reactivity of Homogeneous and Heterogeneous Ruthenium-Based Metathesis Catalysts Containing Electron-Withdrawing Ligands".
J. Am. Chem. Soc. 1997, 119, 9130-9136; Furstner et al; "Total Synthesis of (+)-Ricinelaidic Acid and of (-)-Gloeosporone Based on Transition-Metal-Catalyzed C-C Bond Formations".
Biomol Chem. 2005, 3, 4139-4142; Lewisacid assisted cross metathesis of acrylonitrile with functionalized olefins catalyzed by phosphine-free ruthenium carbine complex Bai, Lu, He, Zhang, Feng.
Synlett 2005, No. 4, 670-672; Vedrenne, Dupont, Oualef, Elkaim Grimaud; "Dramatic Effect of Boron-Based Lewis Acids in Cross-Metathesis Reactions".
Angew. Chem. Int. Ed. 2004, 43, 6161-6165, "Rapidly Initiating Ruthenium Olefin-Metathesis Catalysts" Romero, Piers and McDonald.

* cited by examiner

*Primary Examiner*—Bernard Lipman
(74) *Attorney, Agent, or Firm*—Jennifer R. Seng

(57) ABSTRACT

The metathetic degradation of nitrile rubber can be improved by use of a combination of metal-carbene complex catalysts with specific transition metal additives.

38 Claims, No Drawings

PROCESS FOR THE METATHETIC DEGRADATION OF NITRILE RUBBER

FIELD OF THE INVENTION

The present invention relates to a process for reducing the molecular weight of nitrile rubber by metathesis in the presence of specific catalyst systems.

BACKGROUND OF THE INVENTION

Metathesis reactions are used widely in chemical syntheses, e.g. in the form of ring-closing metathesis (RCM), cross metathesis (CM) or ring-opening metathesis (ROMP). Metathesis reactions are employed, for example, for the synthesis of olefins, for the depolymerization of unsaturated polymers and for the synthesis of telechelic polymers.

Metathesis catalysts are known, inter alia, from WO-A-96/04289 and WO-A-97/06185. They have the following in-principle structure:

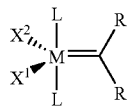

where M is osmium or ruthenium, the radicals R are identical or different organic radicals having a great structural variety, $X^1$ and $X^2$ are anionic ligands and the ligands L are uncharged electron-donors. In the literature, the term "anionic ligands" in the context of such metathesis catalysts always refers to ligands which, when they are viewed separately from the metal centre, are negatively charged for a closed electron shell.

Recently, metathesis reactions have become increasingly important for the degradation of nitrile rubbers.

For the purposes of the present invention, a nitrile rubber, referred to as "NBR" for short, is a nitrile rubber which is a copolymer or terpolymer of at least one α,β-unsaturated nitrite, at least one conjugated diene and, if appropriate, one or more further copolymerizable monomers.

Hydrogenated nitrite rubber, referred to as "HNBR" for short, is produced by hydrogenation of nitrile rubber. Accordingly, the C=C double bonds of the copolymerized diene units in HNBR are completely or partly hydrogenated. The degree of hydrogenation of the copolymerized diene units is usually in the range from 50 to 100%.

Hydrogenated nitrite rubber is a specialty rubber which displays very good heat resistance, excellent resistance to ozone and chemicals and excellent oil resistance.

The abovementioned physical and chemical properties of HNBR are combined with very good mechanical properties, in particular a high abrasion resistance. For this reason, HNBR has found widespread use in a wide variety of applications. HNBR is used, for example, for seals, hoses, belts and damping elements in the automobile sector, also for stators, oil well seals and valve seals in the field of crude oil production and also for numerous parts in the aircraft industry, the electronics industry, machine construction and shipbuilding.

HNBR grades which are commercially available on the market usually have a Mooney viscosity (ML 1+4 at 100° C.) in the range from 55 to 120, which corresponds to a number average molecular weight $M_n$ (determination method: gel permeation chromatography (GPC) against polystyrene standards) in the range from about 200 000 to 700 000. The polydispersity indices PDI measured (PDI=$M_w/M_n$, where $M_w$ is the weight average molecular weight and $M_n$ is the number average molecular weight), which give information about the width of the molecular weight distribution, are frequently 3 or above. The residual double bond content is usually in the range from 1 to 18% (determined by means of IR spectroscopy).

The processability of HNBR is subject to severe restrictions because of the relatively high Mooney viscosity. For many applications an HNBR grade which has a lower molecular weight and thus a lower Mooney viscosity would be desirable. This would significantly improve the processability.

Numerous attempts have been made in the past to shorten the chain length of HNBR by degradation. For example, a decrease in the molecular weight can be achieved by thermomechanical treatment (mastication), e.g. on a roll mill or in a screw apparatus (EP-A-0 419 952). However, this thermomechanical degradation has the disadvantage that function groups such as hydroxyl, keto, carboxylic acid and carboxylic ester groups are introduced into the molecule by partial oxidation and, in addition, the microstructure of the polymer is altered substantially.

For a long time, it has not been possible to produce HNBR having a low molar mass corresponding to a Mooney viscosity (ML 1+4 at 100° C.) in the range below 55 or a number average molecular weight of about $M_n$<200 000 g/mol by means of established production processes since, firstly, a step increase in the Mooney viscosity occurs in the hydrogenation of NBR and secondly the molar mass of the NBR feedstock to be used for the hydrogenation cannot be reduced at will since otherwise work-up in the industrial plants available is no longer possible because the rubber is too sticky. The lowest Mooney viscosity of an NBR feedstock which can be worked up without difficulties in an established industrial plant is about 30 Mooney units (ML 1+4 at 100° C.). The Mooney viscosity of the hydrogenated nitrile rubber obtained using such an NBR feedstock is in the order of 55 Mooney units (ML 1+4 at 100° C.). The Mooney viscosity is determined in accordance with ASTM standard D 1646.

In the more recent prior art, this problem is solved by reducing the molecular weight of the nitrile rubber before hydrogenation by degradation to a Mooney viscosity (ML 1+4 at 100° C.) of less than 30 Mooney units or a number average molecular weight of $M_n$<70 000 g/mol. The reduction in the molecular weight is achieved by metathesis in which low molecular weight 1-olefins are usually added. The metathesis of nitrile rubber is described, for example, in WO-A-02/100905, WO-A-02/100941 and WO-A-03/002613. The metathesis reaction is advantageously carried out in the same solvent as the hydrogenation reaction so that the degraded nitrile rubber does not have to be isolated from the solvent after the degradation reaction is complete before it is subjected to the subsequent hydrogenation. The metathesis degradation reaction is catalyzed using metathesis catalysts which are tolerant to polar groups, in particular nitrile groups.

WO-A-02/100905 and WO-A-02/100941 describe a process comprising the degradation of nitrile rubber starting polymers by olefin metathesis and subsequent hydrogenation to give HNBR having a low Mooney viscosity. Here, a nitrile rubber is reacted in the presence of a coolefin and specific complex catalysts based on osmium, ruthenium, molybdenum or tungsten in a first step and hydrogenated in a second step. In this way, it is possible to obtain hydrogenated nitrile rubbers having a weight average molecular weight ($M_w$) in the range from 30 000 to 250 000, a Mooney viscosity (ML 1+4 at 100° C.) in the range from 3 to 50 and a polydispersity index PDI of less than 2.5.

The metathesis of nitrile rubber can, for example, be carried using the catalyst bis(tricyclohexylphosphine)benzylideneruthenium dichloride shown below.

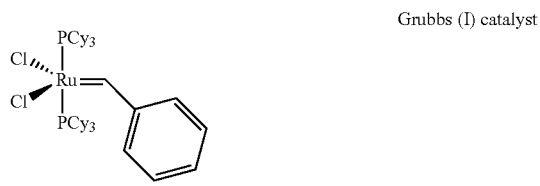

Grubbs (I) catalyst

As a result of metathesis and hydrogenation, the nitrile rubbers have a lower molecular weight and a narrower molecular weight distribution than the hydrogenated nitrile rubbers which have hitherto been able to be produced according to the prior art.

However, the amounts of Grubbs (I) catalyst employed for carrying out the metathesis are large. In the experiments in WO-A-03/002613, they are for example, 307 ppm and 61 ppm of Ru based on the nitrile rubber used. The reaction times necessary are also long and the molecular weights after degradation are still relatively high (see Example 3 of WO-A-03/002613 where $M_w$=180 000 g/mol and $M_n$=71 000 g/mol).

US 2004/0127647 A1 describes blends based on low molecular weight HNBR rubbers having a bimodal or multimodal molecular weight distribution and also vulcanizates of these rubbers. According to the examples, 0.5 phr of Grubbs (1) catalyst is used for carrying out the metathesis. This corresponds to the large amount of 614 ppm of ruthenium based on the nitrite rubber used.

Furthermore, a group of catalysts referred to by those skilled in the art as "Grubbs (II) catalysts" is known from WO-A-00/71554.

If a "Grubbs (II) catalyst" of this type, e.g. the catalyst 1,3-bis(2,4,6-trimethylphenyl)-2-imidazolidenylidene)tricyclohexylphosphine)(phenylmethylene)ruthenium dichloride shown below, is used for the metathesis of NBR (US-A-2004/0132891), this is successful even without use of a coolefin.

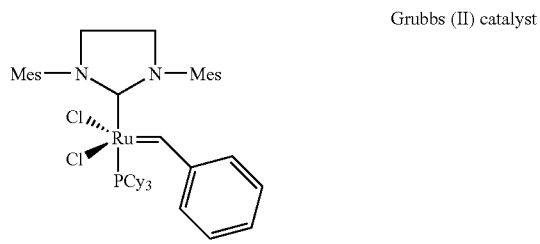

Grubbs (II) catalyst

After the subsequent hydrogenation, which is preferably carried out in the same solvent, the hydrogenated nitrile rubber has lower molecular weights and a narrower molecular weight distribution (PDI) than when catalysts of the Grubbs (I) type are used. In terms of the molecular weight and the molecular weight distribution, the metathetic degradation using catalysts of the Grubbs (II) type proceeds more efficiently than when catalysts of the Grubbs (I) type are used. However, the amounts of ruthenium necessary for this efficient metathetic degradation are still relatively high. Even when the metathesis is carried out using the Grubbs (II) catalyst, long reaction times are still required.

In all the abovementioned processes for the metathetic degradation of nitrile rubber, relatively large amounts of catalyst have to be used and long reaction times are required to produce the desired low molecular weight nitrile rubbers by means of metathesis.

Even in other types of metathesis reactions, the activity of the catalysts used is of critical importance.

In J. Am. Chem. Soc. 1997, 119, 3887-3897, it is stated that in the ring-closing metathesis of diethyl diallylmalonate show below

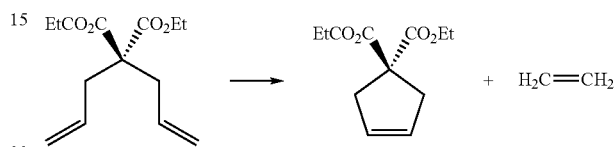

the activity of the catalysts of the Grubbs (I) type can be increased by additions of CuCl and $CuCl_2$. This increase in activity is explained by a shift in the dissociation equilibrium due to a phosphane ligand which leaves its coordination position being scavenged by copper ions to form copper-phosphane complexes.

However, this increase in activity brought about by copper salts in the abovementioned ring-closing metathesis cannot be applied at will to other types of metathesis reactions. Studies by the inventors have shown that, unexpectedly, although the addition of copper salts leads to an initial acceleration of the metathesis reaction in the metathetic degradation of nitrile rubbers, a significant worsening of the metathesis efficiency is observed. The molecular weights of the degraded nitrile rubbers which can be achieved in the end are substantially higher than when the metathesis reaction is carried out in the presence of the same catalyst but in the absence of the copper salts.

An as yet unpublished German patent application describes catalyst systems for metathesis in which one or more salts are used in addition to the actual metathesis catalyst. This combination of one or more salts with the metathesis catalysts leads to an increase in the activity of the catalyst. Many meanings which can be selected from various lists are in each case possible for the anions and cations of these salts. In the examples of this German patent application, the use of lithium bromide is found to be particularly advantageous both for the metathetic degradation of rubbers, e.g. nitrile rubbers, and for the ring-closing metathesis of diethyl diallylmalonate. Catalysts used here are the Grubbs (II) catalyst, the Hoveyda catalyst, the Buchmeiser-Nuyken catalyst and the Grela catalyst.

Owing to the corrosion-promoting action of bromide ions, the use of lithium bromide and also of caesium bromide is not advisable without restrictions for all metathesis reactions. In the production of low molecular weight hydrogenated nitrile rubbers, additional safety aspects, for example, play a role since after the metathetic degradation of the nitrile rubber a hydrogenation is carried out under superatmospheric pressure in steel reactors. Since water is introduced into the reaction mixture via the residual moisture content of the nitrile rubber, when the hydrogenation is carried out in the presence of lithium bromide it is necessary to ensure by means of additional measures that "pit corrosion" of the steel autoclave does not occur. For this reason, the use of bromide additions in the production of particularly low molecular weight nitrile rubbers is not an economically optimal procedure.

The examples of the abovementioned German patent application also make it obvious that the activity-increasing effect of lithium chloride is weaker than that of lithium bromide.

The increase in the activity of metathesis catalysts as a result of the addition of salts was likewise examined in Inorganica Chimica Acta 359 (2006) 2910-2917. The influences of tin chloride, tin bromide, tin iodide, iron(II) chloride, iron (II) bromide, iron(III) chloride, cerium(III) chloride*7H$_2$O, ytterbium(III) chloride, antimony trichloride, gallium dichloride and aluminium trichloride on the self-metathesis of 1-octene to form 7-tetradecene and ethylene were studied. When the Grubbs-I catalyst was used, a significant improvement in the to conversion of 7-tetradecene was observed on addition of tin chloride or tin bromide (Table 1). Without the addition of a salt, a conversion of 25.8% was achieved, when SnCl$_2$*2H$_2$O was added the conversion rose to 68.5% and when tin bromide was added it rose to 71.9%. Addition of tin iodide significantly reduced the conversion from 25.8% to 4.1%. However, in combination with the Grubbs II catalyst, all three tin salts lead to only slight improvements in conversion from 76.3% (reference experiment without addition) to 78.1% (SnCl$_2$), to 79.5% (SnBr$_2$) and 77.6% (SnI$_2$). When the "Phobcats" [Ru(phobCy)$_2$Cl$_2$ (=ChPh)] is used, the conversion is reduced from 87.9% to 80.8% by addition of SuCl$_2$, to 81.6% by addition of SnBr$_2$ and to 73.9% by addition of SnI$_2$. When iron(II) salts are used in combination with the Grubbs I catalyst, the increase in conversion when iron(II) bromide is used is higher than when iron(II) chloride is used. It may be noted that regardless of the type of catalyst used, the conversion is always higher when bromides are used than when the corresponding chlorides are used.

However, the use of the tin bromide or iron(II) bromide described in Inorganica Chimica Acta 359 (2006) 2910-2917 is not an optimal solution for the preparation of nitrite rubbers because of the corrosive nature of the bromides, as described above.

In the preparation of hydrogenated nitrile rubbers, the solvent is usually removed by steam distillation after the hydrogenation. If tin salts are used as part of the catalyst system, certain amounts of these tin salts get into the wastewater which therefore has to be purified, which costs money. For this reason, the use of tin salts for increasing the activity of catalysts in the preparation of nitrite rubbers is not economically advisable.

The use of iron salts is restricted by the fact that they reduce the capacity of some ion-exchange resins which are usually used for recovering the noble metal compounds used in the hydrogenation. This likewise impairs the economics of the overall process.

Furthermore, ChemBioChem 2003, 4, 1229-1231, describes the synthesis of polymers by ring-opening metathesis polymerization (ROMP) of norbornyl oligopeptides in the presence of a ruthenium-carbene complex Cl$_2$(PCy$_3$)$_2$Ru=CHphenyl, with LiCl being added. The addition of LiCl is undertaken with the declared aim of avoiding aggregation and increasing the solubility of the growing polymer chains. Nothing is reported about an activity-increasing effect of the salt addition on the catalyst.

J. Org. Chem. 2003, 68, 202-2023, too, discloses carrying out a ring-opening polymerization of oligopeptide-substituted norbornenes, in which LiCl is added. Here too, the influence of LiCl as solubility-increasing additive for the peptides in nonpolar organic solvents is emphasized. For this reason, an increase in the degree of polymerization DP can be achieved by addition of LiCl.

In J. Am. Chem. Soc. 1997, 119, 3887-3897, it is stated that metathesis catalysts containing NHC ligands, e.g. the Grubbs (II) catalyst, are treated with LiBr or NaI to replace the chloride ligands of the Grubbs (II) catalyst by bromide or iodide.

In J. Am. Chem. Soc. 1997, 119, 9130, it is stated that an improvement in yield can be achieved in the ring-closing metathesis of 1,ω-dienes by addition of tetraisopropoxytitanate so as to increase the activity of the Grubbs (I) catalyst. In the cyclization of the 9-decenoic ester of 4-pentenoate, a higher yield of the macrolide is achieved when tetraisopropoxytitanate is added than when LiBr is added. There is no indication of the extent to which this effect can also be applied to other types of metathesis reactions or other metathesis catalysts.

In Biomol. Chem. 2005, 3, 4139, the cross metathesis (CM) of acrylonitrile with itself and with other functionalized olefins using [1,3-bis(2,6-dimethylphenyl)-4,5-dihydroimidazol-2-ylidene](C$_5$H$_5$N)$_2$(Cl)$_2$Ru=CHPh is examined. The addition of tetraisopropoxytitanate improves the yield of the respective product. This publication gives the impression that the activity-increasing action of tetraisopropoxytitanate occurs only when a specific catalyst having pyridine ligands is used. There is no indication that tetraisopropoxytitanate has an effect when pyridine-free catalysts are used or in other types of metathesis reactions.

It is known from Synlett 2005, No 4, 670-672, that the addition of tetraisopropoxytitanate in the cross metathesis of allyl carbamate with methylacrylate has a negative influence on the product yield when the Hoveyda catalyst is used as catalyst. Thus, the product yield is reduced from 28% to 0% by addition of tetraisopropoxytitanate. An addition of dimethylaluminum chloride also reduces the yield from 28% to 20%. In contrast, the product yield is improved by additions of boric acid derivatives.

It is clear from the above that no teachings which indicate how the reduction of the molecular weight of nitrile rubber by metathesis can be improved can be derived from the literature since the transferability of results from one metathesis reaction to another is not apparent. The transfer of results obtained using a specific metathesis catalyst to another is also not possible.

It is therefore an object of the invention to achieve an increase in the activity of the metathesis catalyst used for reducing the molecular weight of nitrile rubber by metathesis and at the same time ensure that gelling of the nitrite rubber does not occur.

SUMMARY OF THE INVENTION

It has surprisingly been found that the reduction in the molecular weight of nitrite rubber by metathesis can be significantly improved when a combination of a metathesis catalyst and particular transition metal compounds is used. Significantly narrower molecular weight distributions and lower molecular weights can be obtained without gelling being observed.

The invention provides a process for reducing the molecular weight of nitrite rubber, in which a nitrite rubber is brought into contact with a metathesis catalyst which is a complex catalyst based on a metal of transition group 6 or 8 of the Periodic Table and has at least one ligand bound in a carbene-like fashion to the metal and also a compound of the general formula (I)

$$M(OZ)_m \tag{I}$$

where
M is a transition metal of transition group 4, 5 or 6 of the Period Table of the Elements,
m is 4, 5 or 6 and
the radicals Z are identical or different and are each a linear, branched, aliphatic, cyclic, heterocyclic or aromatic radical which has 1-32 carbon atoms and may additionally have from 1 to 15 heteroatoms.

DETAILED DESCRIPTION OF THE INVENTION

The metathesis reaction occurring in the process of the invention is a cross metathesis during which degradation of the polymer chains of the nitrile rubber occurs.

Suitable transition metals of transition group 4, 5 or 6 in the compounds of the general formula (I) are titanium, zirconium, hafnium, vanadium, niobium, tantalum, chromium, molybdenum and tungsten.

In the compounds of the general formula (I), the radicals Z are identical or different and are linear, branched, aliphatic, cyclic, heterocyclic or aromatic radicals which have 1-30 carbon atoms and may additionally have from 1 to 15 heteroatoms, preferably nitrogen or oxygen.

With the proviso that the radicals Z have 1-32 carbon atoms and may additionally have from 1 to 15 heteroatoms, preferably nitrogen or oxygen, Z can be straight-chain or branched $C_1$-$C_{30}$-alkyl, preferably $C_1$-$C_{20}$-alkyl, particularly preferably $C_1$-$C_{12}$-alkyl, $C_3$-$C_{20}$-cycloalkyl, preferably $C_3$-$C_{10}$-cycloalkyl, particularly preferably $C_5$-$C_8$-cycloalkyl, $C_2$-$C_{20}$-alkenyl preferably $C_2$-$C_8$-alkenyl, $C_2$-$C_{20}$-alkynyl, a radical of the general formula $(—CHZ^1—CHZ^1-A^2-)_p—CH_2—CH_3$, where p is an integer from 1 to 10, the radicals $Z^1$ are identical or different and are each hydrogen or methyl, with the radicals $Z^1$ located on adjacent carbon atoms preferably being different, and $A^2$ is oxygen, sulphur or —NH, a $C_6$-$C_{24}$-aryl, preferably $C_6$-$C_{14}$-aryl or a $C_4$-$C_{23}$-heteroaryl radical having at least 1 heteroatom, preferably nitrogen or oxygen.

In the process of the invention, preference is given to using compounds of the general formula (I) in which
M is titanium, zirconium, hafnium, vanadium, niobium, tantalum, chromium, molybdenum or tungsten,
m is 4, 5 or 6 and
Z is methyl, ethyl, n-propyl, i-propyl, n-butyl, i-butyl, tert-butyl, n-pentyl, i-pentyl, tert-pentyl, dodecyl, oleyl, phenyl or sterically hindered phenyl.

Particular preference is given to using tetraethyloxytitanate, tetraisopropyloxytitanate, tetra-tert-butyloxytitanate, tetra-tert-butyloxyzirconate, pentaethoxyniobate and pentaethoxytantalate as compounds of the general formula (I) in the process of the invention.

For the purposes of the present patent application and invention, all general or preferred definitions of radicals, parameters or explanations mentioned above and in the following can be combined with one another, i.e. between the respective ranges and preferred ranges, in any desired way.

The term "substituted" used for the purposes of the present patent application in connection with the metathesis catalyst or the compound of the general formula (I) means that a hydrogen atom on the radical or atom indicated has been replaced by one of the groups indicated in each case, with the proviso that the valency of the indicated atom is not exceeded and the substitution leads to a stable compound.

The metathesis catalysts to be used in the process of the invention are complex catalysts based on a metal of transition group 6 or 8 of the Periodic Table. These complex catalysts have the common structural feature that they have at least one ligand which is bound in a carbene-like fashion to the metal.

In a preferred embodiment, the complex catalyst has two carbene ligands, i.e. two ligands which are bound in a carbene-like fashion to the central metal of the complex. As metals of transition groups 6 and 8 of the Periodic Table, preference is given to molybdenum, tungsten, osmium and ruthenium.

As catalysts to be employed in the process of the invention, it is possible to use catalysts of the general formula (A),

(A)

where
M is osmium or ruthenium,
$X^1$ and $X^2$ are identical or different and are two ligands, preferably anionic ligands,
the symbols L represent identical or different ligands, preferably uncharged electron donors,
the radicals R are identical or different and are each hydrogen, alkyl, preferably $C_1$-$C_{30}$-alkyl, cycloalkyl, preferably $C_3$-$C_{20}$-cycloalkyl, alkenyl, preferably $C_2$-$C_{20}$-alkenyl, alkynyl, preferably $C_2$-$C_{20}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{10}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphynyl, preferably $C_1$-$C_{20}$-alkylsulphynyl, where these radicals may in each case be substituted by one or more alkyl, halogen, alkoxy, aryl or heteroaryl radicals or, as an alternative, the two radicals R together with the common carbon atom to which they are bound are bridged to form a cyclic group which can be aliphatic or aromatic in nature, may be substituted and may contain one or more heteroatoms.

In preferred catalysts of the general formula (A), one radical R is hydrogen and the other radical R is $C_1$-$C_{20}$-alkyl, $C_3$-$C_{10}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl or $C_1$-$C_{20}$-alkylsulphynyl, where these radicals may in each case be substituted by one or more alkyl, halogen, alkoxy, aryl or heteroaryl radicals.

In the catalysts of the general formula (A), $X^1$ and $X^2$ are identical or different and are two ligands, preferably anionic ligands.

$X^1$ and $X^2$ can be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphynyl radicals.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where these radicals, too, may once again be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy; $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH)_2CO$, PhO (phenoxy), MeO (methoxy), EtO (ethoxy), tosylate ($pCH_3$—$CH_4$—$SO_3$), mesylate (2,4,6-trimethylphenyl) or $CF_3SO_3$ (trifluoromethanesulphonate).

In the general formula (A), the symbols L represent identical or different ligands, preferably uncharged electron donors.

The two ligands L can, for example, be, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

Preference is given to the two ligands L each being, independently of one another, a $C_6$-$C_{24}$-arylphosphine, $C_1$-$C_5$-alkylphospine or $C_3$-$C_{20}$-cycloalkylphosphine ligand, a sulphonated $C_6$-$C_{24}$-arylphosphine or sulphonated $C_1$-$C_{10}$-alkylphosphine ligand, a $C_6$-$C_{24}$-arylphosphinite or $C_1$-$C_{10}$-alkylphosphinite ligand, a $C_6$-$C_{24}$-arylphosphonite or $C_1$-$C_{10}$-alkylphosphonite ligand, a $C_6$-$C_{24}$-aryl phosphite or $C_1$-$C_{10}$-alkyl phosphite ligand, a $C_6$-$C_{24}$-arylarsine or $C_1$-$C_{10}$-alkylarsine ligand, a $C_6$-$C_{24}$-arylamine or $C_1$-$C_{10}$-alkylamine ligand, a pyridine ligand, a $C_6$-$C_{24}$-aryl sulphoxide or $C_1$-$C_{10}$-alkyl sulphoxide ligand, a $C_6$-$C_{24}$-aryl ether or $C_1$-$C_{10}$-alkyl ether ligand or a $C_6$-$C_{24}$-arylamide or $C_1$-$C_{10}$-alkylamide ligand, each of which may be substituted by a phenyl group which may in turn be substituted by a halogen-, $C_1$-$C_5$-alkyl or $C_1$-$C_5$-alkoxy radical.

The term "phosphine" includes, for example, $PPh_3$, P(p-Tol)$_3$, P(o-Tol)$_3$, $PPh(CH_3)_2$, $P(CF_3)_3$, P(p-FC$_6$H$_4$)$_3$, P(p-CF$_3$C$_6$H$_4$)$_3$, P(C$_6$—SO$_3$Na)$_3$, P(CH$_2$C$_6$H$_4$—SO$_3$Na)$_3$, P(isopropyl)$_3$, P(CHCH$_3$(CH$_2$CH$_3$))$_3$, P(cyclopentyl)$_3$, P(cyclohexy)$_3$, P(neopentyl)$_3$ and P(neophenyl)$_3$.

The term "phosphinite" includes, for example, phenyl diphenylphosphinite, cyclohexyl dicyclohexylphosphinite, isopropyl diisopropylphosphinite and methyl diphenylphosphinite.

The term "phosphite" includes, for example, triphenyl phosphite, tricyclohexyl phosphite, tri-tert-butyl phosphite, triisopropyl phosphite and methyl diphenyl phosphite.

The term "stibine" includes, for example, triphenylstibine, tricyclohexylstibine and trimethylstibine.

The term "sulphonate" includes, for example, trifluoromethanesulphonate, tosylate and mesylate.

The term "sulphoxide" includes, for example, $CH_3S(=O)CH_3$ and $(C_6H_5)_2SO$.

The term "thioether" includes, for example, $CH_3SCH_3$, $C_6H_5SCH_3$, $CH_3OCH_2CH_2SCH_3$ and tetrahydrothiophene.

For the purposes of the present application, the term "pyridine" is used as a collective term for all nitrogen-containing ligands mentioned by Grubbs in WO-A-03/011455. Examples are: pyridine, picolines (α-, β- and γ-picoline), lutidines (2,3-, 2,4-, 2,5-, 2,6-, 3,4- and 3,5-lutidine), collidine (2,4,6-trimethylpyridine), trifluoromethylpyridine, phenylpyridine, 4-(dimethylamino)pyridine, chloropyridines, bromopyridines, nitropyridines, quinoline, pyrimidine, pyrrole, imidazole and phenylimidazole.

The imidazolidine radical (Im) usually has a structure corresponding to the general formulae (IIa) or (IIb),

(IIa)

(IIb)

where
$R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphynyl.

If appropriate, one or more of the radicals $R^8$, $R^9$, $R^{10}$, $R^{11}$ can independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these above-mentioned substituents may in turn be substituted one or more radicals, preferably radicals selected from the group consisting of halogen, in particular chlorine or bromine, $C_1$-$C_5$-alkyl, $C_1$-$C_5$-alkoxy and phenyl.

Merely in the interest of clarity, it may be added that the structures of the imidazolidine radical depicted in the general formulae (IIa) and (IIb) in the present patent application are equivalent to the structures (IIa') and (IIb') which are frequently also found in the literature for this imidazolidine radical (Im) and emphasize the carbene character of the imidazolidine radical This applies analogously to the associated preferred structures (IIIa)-(IIIf) depicted later on in the text.

(IIa')

(IIb')

In a preferred embodiment of the catalysts of the general formula (A), $R^8$ and $R^9$ are each, independently of one another, hydrogen, $C_6$-$C_{24}$-aryl, particularly preferably phenyl, straight-chain or branched $C_1$-$C_{10}$-alkyl particularly preferably propyl or butyl, or together with the carbon atoms to which they are bound form a cycloalkyl or aryl radical, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the catalysts of the general formula (A), the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, $C_6$-$C_{10}$-arylsulphonate, particularly preferably p-toluenesulphonate.

The abovementioned radicals as meanings of $R^{10}$ and $R^{11}$ may be substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl, neopentyl, adamantyl, mesityl or 2,6-diisopropylphenyl.

Particularly preferred imidazolidine radicals (Im) have the following structures (IIa) to (IIIf), where Mes is in each case 2,4,6-trimethylphenyl or alternatively in all cases 2,6-diisopropylphenyl,

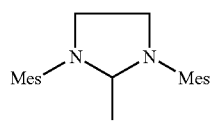
(IIIa)

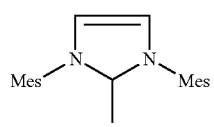
(IIIb)

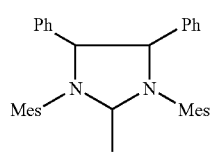
(IIIc)

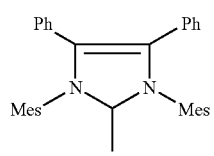
(IIId)

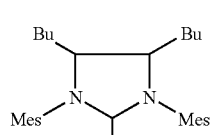
(IIIe)

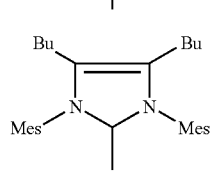
(IIIf)

Various representatives of the catalysts of the formula (A) are known in principle, e.g. from WO-A-96/04289 and WO-A-97/06185.

As an alternative to the preferred Im radicals, one or both ligands L in the general formula (A) are also preferably identical or different trialkylphosphine ligands in which at least one of the alkyl groups is a secondary alkyl group or a cycloalkyl group, preferably isopropyl, isobutyl, sec-butyl, neopentyl, cyclopentyl or cyclohexyl.

Particular preference is given to one or both ligands L in the general formula (A) being a trialkylphosphine ligand in which at least one of the alkyl groups is a secondary alkyl group or a cycloalkyl group, preferably isopropyl, isobutyl, sec-butyl, neopentyl, cyclopentyl or cyclohexyl.

Particular preference is given to using one of the two catalysts below, which come under the general formula (A) and have the structures (IV) (Grubbs (I) catalyst) and (V) (Grubbs (II) catalyst), where Cy is cyclohexyl.

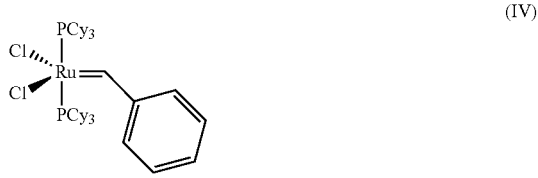
(IV)

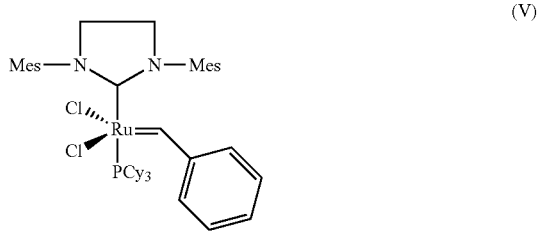
(V)

In a further embodiment, use is made of catalysts of the general formula (A1),

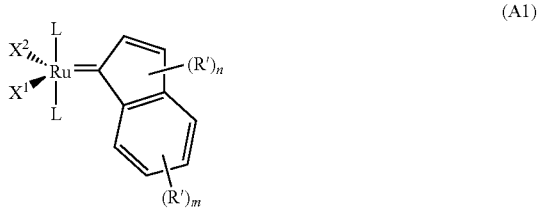
(A1)

where
X$^1$, X$^2$ and L can have the same general, preferred and particularly preferred meanings as
X$^1$, X$^2$ and L in the general formula (A),
n is 0, 1 or 2,
m is 0, 1, 2, 3 or 4 and
the radicals R' are identical or different and are alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radicals which may in each case be substituted by one or more alkyl, halogen, alkoxy, aryl or heteroaryl radicals.

As preferred catalyst coming under the general formula (A1), it is possible to use, for example, the catalyst of the formula (VI) below, where Mes is in each case 2,4,6-trimethylphenyl and Ph is phenyl.

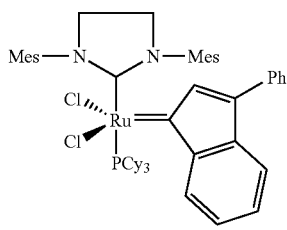

(VI)

This catalyst which is also referred to in the literature as "Nolan catalyst" is known, for example, from WO-A-2004/12951.

Further catalysts which are suitable for use in the process of the invention are those of the general formula (B),

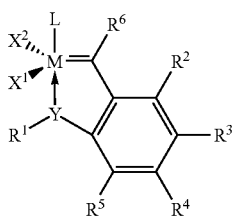

(B)

where

M is ruthenium or osmium, $X^1$ and $X^2$ are identical or different ligands, preferably anionic ligands, Y is oxygen (O), sulphur (S), an N—$R^1$ radical or a PART radical, where $R^1$ is as defined below, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radical which may in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, $R^6$ is hydrogen or an alkyl, alkenyl, alkynyl or aryl radical and L is a ligand which has the same meanings as in formula (A).

The catalysts of the general formula (B) are known in principle. Representatives of this class of compounds are the catalysts described by Hoveyda et al. in US 2002/0107138 A1 and Angew Chem. Int. Ed. 2003, 42, 4592, and the catalysts described by Grela in WO-A-2004/035596, Eur. J. Org. Chem. 2003, 963-966 and Angew. Chem. Int. Ed. 2002, 41, 4038 and also in J. Org. Chem. 2004, 69, 6894-96 and Chem. Eur. J. 2004, 10, 777-784. The catalysts are commercially available or can be prepared as described in the literature references cited.

In the catalysts of the general formula (B), L is a ligand which usually possesses an electron donor function and can have the same general, preferred and particularly preferred meanings as L in the general formula (A).

Furthermore, L in the general formula (B) is preferably a $P(R^7)_3$ radical, where the radicals $R^7$ are each, independently of one another, $C_1$-$C_6$-alkyl, $C_3$-$C_8$-cycloalkyl or aryl, or else a substituted or unsubstituted imidazolidine radical ("Im").

$C_1$-$C_6$-alkyl is, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl and n-hexyl.

$C_3$-$C_8$-cycloalkyl encompasses cyclopropyl, cyclobutyl, cyclopentyl, cyclohexyl, cycloheptyl and cyclooctyl.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

The imidazolidine radical (Im) usually has a structure of the general formula (IIa) or (IIb),

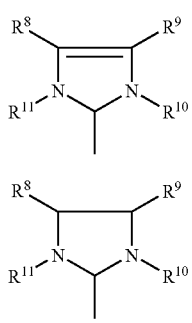

(IIa)

(IIb)

where $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{10}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphynyl.

If appropriate, one or more of the radicals $R^8$, $R^9$, $R^{10}$, $R^{11}$ may, independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals, preferably radicals selected from the group consisting of halogen, in particular chlorine or bromine, $C_1$-$C_5$-alkyl, $C_1$-$C_5$-alkoxy and phenyl.

In a preferred embodiment of the process of the invention, use is made of catalysts of the general formula (B) in which $R^8$ and $R^9$ are each, independently of one another, hydrogen, $C_6$-$C_{24}$-aryl, particularly preferably phenyl, straight-chain or branched $C_1$-$C_{10}$-alkyl, particularly preferably propyl or butyl, or together with the carbon atoms to which they are bound form a cycloalkyl or aryl radial, where all the abovementioned radicals may in turn be substituted by one or more further radicals selected from the group consisting of straight-chain or branched $C_1$-$C_{10}$-alkyl, $C_1$-$C_{10}$-alkoxy, $C_6$-$C_{24}$-aryl and a functional group selected from the group consisting of hydroxy, thiol, thioether, ketone, aldehyde, ester, ether, amine, imine, amide, nitro, carboxylic acid, disulphide, carbonate, isocyanate, carbodiimide, carboalkoxy, carbamate and halogen.

In a preferred embodiment of the process of the invention, use is made of catalysts of the general formula (B) in which the radicals $R^{10}$ and $R^{11}$ are identical or different and are each straight-chain or branched $C_1$-$C_{10}$-alkyl, particularly preferably i-propyl or neopentyl, $C_3$-$C_{10}$-cycloalkyl, preferably adamantyl, $C_6$-$C_{24}$-aryl, particularly preferably phenyl, $C_1$-$C_{10}$-alkylsulphonate, particularly preferably methanesulphonate, or $C_6$-$C_{10}$-arylsulphonate, particularly preferably p-toluenesulphonate.

The abovementioned radicals as meanings of $R^{10}$ and $R^{11}$ may be substituted by one or more further radicals selected from the group consisting of straight-chain or branched $C_1$-$C_5$-alkyl, in particular methyl, $C_1$-$C_5$-alkoxy, aryl and a functional group selected from the group consisting of hydroxy, thiol, thioether, ketone, aldehyde, ester ether, amine, imine, amide, nitro, carboxylic acid, disulphide, carbonate, isocyanate, carbodiimide, carboalkoxy, carbamate and halogen.

In particular, the radicals $R^{10}$ and $R^{11}$ can be identical or different and are each i-propyl neopentyl, adamantyl or mesityl.

Particularly preferred imidazolidine radicals (Im) have the structures (IIIa-IIIf) mentioned above for the general formula (A).

In the catalysts of the general formula (B), $X^1$ and $X^2$ are identical or different and can each be, for example, hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphynyl.

The abovementioned radicals $X^1$ and $X^2$ can also be substituted by one or more further radicals, for example by halogen, preferably fluorine, $C_1$-$C_{10}$-alkyl, $C_1$-$C_{10}$-alkoxy or $C_6$-$C_{24}$-aryl, where the latter radicals may in turn also be substituted by one or more substituents selected from the group consisting of halogen, preferably fluorine, $C_1$-$C_5$-alkyl, $C_1$-$C_5$-alkoxy and phenyl.

In a preferred embodiment, $X^1$ and $X^2$ are identical or different and are each halogen, in particular fluorine, chlorine, bromine or iodine, benzoate, $C_1$-$C_5$-carboxylate, $C_1$-$C_5$-alkyl, phenoxy, $C_1$-$C_5$-alkoxy, $C_1$-$C_5$-alkylthiol, $C_6$-$C_{24}$-arylthiol, $C_6$-$C_{24}$-aryl or $C_1$-$C_5$-alkylsulphonate.

In a particularly preferred embodiment, $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

In the general formula (B), the radical $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radical which may in each case optionally be substituted by one or more alkyl halogen, alkoxy, aryl or heteroaryl radicals.

The radical $R^1$ is usually a $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphynyl radical which may in each case optionally be substituted by one or more alkyl, halogen, alkoxy, aryl or heteroaryl radicals.

$R^1$ is preferably a $C_3$-$C_{20}$-cylcoalkyl radical, a $C_6$-$C_{24}$-aryl radical or a straight-chain or branched $C_1$-$C_{30}$-alkyl radical, with the latter being able, if appropriate, to be interrupted by one or more double or triple bonds or one or more heteroatoms, preferably oxygen or nitrogen. $R^1$ is particularly preferably a straight-chain or branched $C_1$-$C_{12}$-alkyl radical.

$C_3$-$C_{20}$-Cycloalkyl radicals encompass, for example, cyclopropyl, cyclobutyl, cyclopentyl, cyclohexyl, cycloheptyl and cyclooctyl.

A $C_1$-$C_{12}$-alkyl radical can be, for example, methyl, ethyl, n-propyl, isopropyl, n-butyl, sec-butyl, tert-butyl, n-pentyl, 1-methylbutyl, 2-methylbutyl, 3-methylbutyl, neopentyl, 1-ethylpropyl, n-hexyl, n-heptyl, n-octyl, n-decyl or n-dodecyl. In particular, $R^1$ is methyl or isopropyl.

A $C_6$-$C_{24}$-aryl radical is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

In the general formula (B), the radicals $R^2$, $R^3$, $R^4$ and $R^5$ are identical or different and can each be hydrogen or an organic or inorganic radical.

In an appropriate embodiment, $R^2$, $R^3$, $R^4$, $R^5$ are identical or different and are each hydrogen, halogen, nitro, $CF_3$, alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl which may be in each case optionally be substituted by one or more alkyl, alkoxy, halogen, aryl or heteroaryl radicals.

$R^2$, $R^3$, $R^4$, $R^5$ are usually identical or different and are each hydrogen, halogen, preferably chlorine or bromine, nitro, $CF_3$, $C_1$-$C_{30}$-alkyl, $C_3$-$C_{20}$-cylcoalkyl, $C_2$-$C_{20}$-alkenyl, $C_2$-$C_{20}$-alkynyl, $C_6$-$C_{24}$-aryl, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{10}$-alkylamino, $C_1$-$C_{20}$-alkylthio, $C_6$-$C_{24}$-arylthio, $C_1$-$C_{20}$-alkylsulphonyl or $C_1$-$C_{20}$-alkylsulphynyl which may in each case optionally be substituted by one or more $C_1$-$C_{30}$-alkyl, $C_1$-$C_{20}$-alkoxy, halogen, $C_6$-$C_{24}$-aryl or heteroaryl radicals.

In a particularly useful embodiment, $R^2$, $R^3$, $R^4$, $R^5$ are identical or different ad are each nitro, straight-chain or branched $C_1$-$C_{30}$-alkyl, $C_5$-$C_{20}$-cylcoalkyl, straight-chain or branched $C_1$-$C_{20}$-alkoxy or $C_6$-$C_{24}$-aryl radicals, preferably phenyl or naphthyl. The $C_1$-$C_{30}$-alkyl radicals and $C_1$-$C_{20}$-alkoxy radicals may optionally be interrupted by one or more double or triple bonds or one or more heteroatoms, preferably oxygen or nitrogen.

Furthermore, two or more of the radicals $R^2$, $R^3$, $R^4$ or $R^5$ can also be bridged via aliphatic or aromatic structures. For example, $R^3$ and $R^4$ together with the carbon atoms to which they are bound in the phenyl ring of the formula (B) can form a fused-on phenyl ring so that, overall, a naphthyl structure results.

In the general formula (B), the radical $R^6$ is hydrogen or an alkyl, alkenyl, alkynyl or aryl radical. $R^6$ is preferably hydrogen, a $C_1$-$C_{30}$-alkyl radical, a $C_2$-$C_{20}$-alkenyl radical, a $C_2$-$C_{20}$-alkynyl radical or a $C_6$-$C_{24}$-aryl radical. $R^6$ is particularly preferably hydrogen.

Further catalysts which are suitable for the process of the invention are catalysts of the general formula (B1),

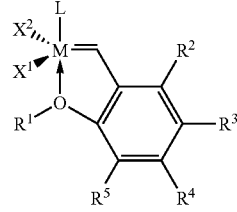

(B1)

where

M, L, $X^1$, $X^2$, $R^1$, $R^2$, $R^3$, $R^4$ and $R^5$ can have the general, preferred and particularly preferred meanings mentioned for the general formula (B).

The catalysts of the general formula (B1) are known in principle from, for example. US 2002/0107138 A1 (Hoveyda et al.) and can be obtained by preparative methods indicated there.

Particular preference is given to catalysts of the general formula (B1) in which M is ruthenium, $X^1$ and $X^2$ are both halogen, in particular both chlorine, $R^1$ is a straight-chain or branched $C_1$-$C_{12}$-alkyl radical, $R^2$, $R^3$, $R^4$, $R^5$ have the general and preferred meanings mentioned for the general formula (B) and L has the general and preferred meanings mentioned for the general formula (B).

Very particular preference is given to catalysts of the general formula (B1) in which M is ruthenium, $X^1$ and $X^2$ are both chlorine, $R^1$ is an isopropyl radical, $R^2$, $R^3$, $R^4$, $R^5$ are all hydrogen and L is a substituted or unsubstituted imidazolidine radical of the formula (IIa) or (IIb), where the radicals $R^8$, $R^9$, $R^{10}$, $R^{11}$ can have all general and preferred meanings mentioned above.

In the process of the invention, very particular preference is given to using a catalyst which comes under the general structural formula (B1) and has the formula (VII), where Mes is in each case 2,4,6-trimethylphenyl.

(VII)

This catalyst (VII) is also referred to as "Hoveyda catalyst" in the literature.

Further suitable catalysts are those which come under the general structural formula (B1) and have one of the formulae (VIII), (IX), (X), (XI), (XII), (XIII), (XIV) and (XV) below, where Mes is in each case 2,4,6-trimethylphenyl, (VIII)

-continued (IX)

(X)

(XI)

(XII)

(XIII)

(XIV)

-continued

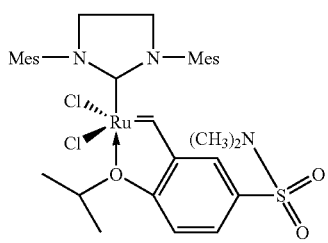
(XV)

Further catalysts suitable for the process of the invention are catalysts of the general formula (B2),

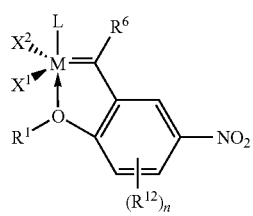
(B2)

where

M, L, $X^1$, $X^2$, $R^1$ and $R^6$ have the general and preferred meanings mentioned for the formula (B), the radicals $R^{12}$ are identical or different and have the general and preferred meanings, with the exception of hydrogen, mentioned for the radicals $R^2$, $R^3$, $R^4$ and $R^5$ in the formula (B) and n is 0, 1, 2 or 3.

The catalysts of the general formula (B2) are known in principle from, for example, WO-A-2004/035596 (Greta) and can be obtained by preparative methods indicated there.

Particular preference is given to using catalysts of the general formula (B2) in which M is ruthenium, $X^1$ and $X^2$ are both halogen, in particular both chlorine, $R^1$ is a straight-chain or branched $C_1$-$C_{12}$-alkyl radical, $R^{12}$ has the meanings mentioned for the general formula (B2), n is 0, 1, 2 or 3, $R^6$ is hydrogen and L has the meanings mentioned for the general formula (B).

Very particular preference is given to using catalysts of the general formula (B2) in which M is ruthenium, $X^1$ and $X^2$ are both chlorine, $R^1$ is an isopropyl radical, n is 0 and L is a substituted or unsubstituted imidazolidine radical of the formulae (IIa) or (IIb), where $R^8$, $R^9$, $R^{10}$, $R^{11}$ are identical or different and can have all general and preferred meanings of L in the catalysts of the general formula (B1).

A further particularly useful catalyst is that which comes under the general formula (B2) and has the structure (XVI).

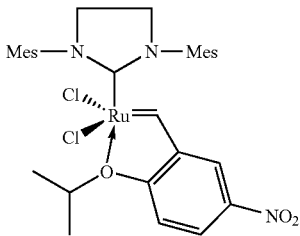
(XVI)

The catalyst (XVI) is also referred to as "Grela catalyst" in the literature.

A further catalyst which is suitable for the process of the invention and comes under the general formula (B2) has the structure (XVII) where Mes is in each case 2,4,6-trimethylphenyl.

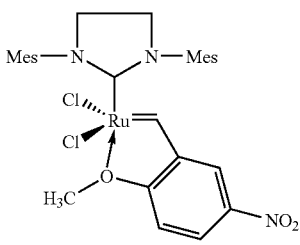
(XVII)

In a further alternative embodiment of the process of the invention, it is possible to use catalysts of the general formula (B3) having a dendritic structure,

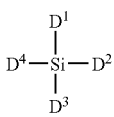
(B3)

where $D^1$, $D^2$, $D^3$ and $D^4$ each have a structure of the general formula (XVIII) shown below which is bound via the methylene group shown at right to the silicon of the formula (B3),

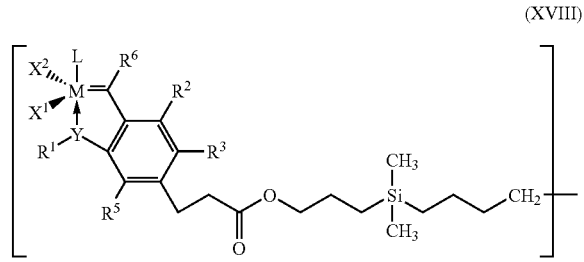
(XVIII)

where

M, L, $X^1$, $X^2$, $R^1$, $R^2$, $R^3$, $R^5$ and $R^6$ can have the general and preferred meanings mentioned for the general formula (B). Such catalysts of the general formula (B3) are known from US 2002/0107138 A1 and can be prepared as described there.

In a further alternative embodiment of the process of the invention, it is possible to use catalysts of the formula (B4), (B4)

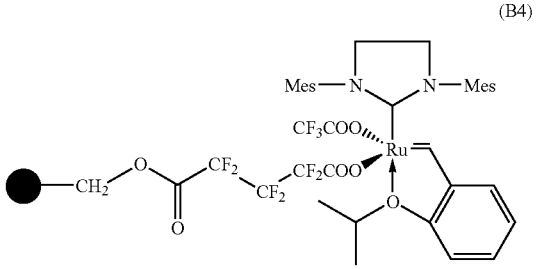

where the symbol ● represents a support.

The support is preferably a poly(styrene-divinylbenzene) copolymer (PS-DVB).

These catalysts of the formula (B4) are known in principle from Chem. Eur. J. 2004 10, 777-784 and can be obtained by the preparative methods described there.

All the abovementioned catalysts of the in-principle type (B) can either be used as such in the reaction mixture of the NBR metathesis or can be applied to and immobilized on a solid support. Suitable solid phases or supports are materials which firstly are inert towards the reaction mixture of the metathesis and secondly do not adversely affect the activity of the catalyst. To immobilize the catalyst, it is possible to use, for example, metals, glass, polymers, ceramic, organic polymer spheres or inorganic sol-gels and also carbon black, silicates, silicates, calcium carbonate and barium sulphate.

In a further embodiment of the process of the invention, it is possible to use catalysts of the general formula (C),

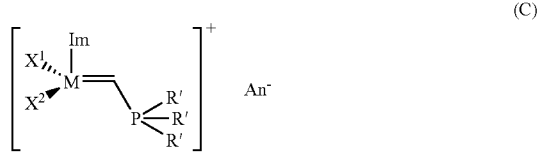

(C)

where

M is ruthenium or osmium, $X^1$ and $X^2$ are identical or different and are anionic ligands, the radicals R' are identical or different and are organic radicals, Im is a substituted or unsubstituted imidazolidine radical and An is an anion.

The catalysts of the general formula (C) are known in principle (see, for example, Angew. Chem. Int. Ed. 2004, 43, 6161-6165).

$X^1$ and $X^2$ in the general formula (C) can have the same general, preferred and particularly preferred meanings as in the formulae (A) and (B).

The imidazolidine radical (Im) usually has a structure of the general formula (IIa) or (IIb) which have been mentioned above for the catalyst type of the formulae (A) and (B) and can have all the structures mentioned there as preferred, in particular those of the formulae (IIIa)-(IIIf).

The radicals R' in the general formula (C) are identical or different and are each a straight-chain or branched $C_1$-$C_{30}$-alkyl, $C_5$-$C_{30}$-cycloalkyl or aryl radical, where the $C_1$-$C_{30}$-alkyl radicals may be interrupted by one or more double or triple bonds or one or more heteroatoms, preferably oxygen or nitrogen.

Aryl is an aromatic radical having from 6 to 24 skeletal carbon atoms. As preferred monocyclic, bicyclic or tricyclic carbocyclic aromatic radicals having from 6 to 10 skeletal carbon atoms, mention may be made by way of example of phenyl, biphenyl, naphthyl, phenanthrenyl or anthracenyl.

Preference is given to the radicals R' in the general formula (C) being identical and each being phenyl, cyclohexyl, cyclopentyl, isopropyl, o-tolyl, o-xylyl or mesityl.

Further catalysts suitable for use in the process of the invention are catalysts of the general formula (D)

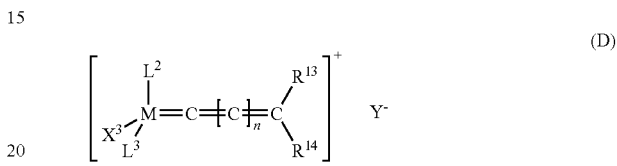

(D)

where

M is ruthenium or osmium $R^{13}$ and $R^{14}$ are each, independently of one another, hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl. $C_1$-$C_{20}$-alkylthio, $C_1$-$C_{20}$-alkylsulphonyl or $C_1$-$C_{20}$-alkylsulphynyl, $X^3$ is an anionic ligand, $L^2$ is an uncharged p-bonded ligand which may either be monocyclic or polycyclic, $L^3$ is a ligand selected from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines stibines, ethers, amines, amides, imines, sulphoxides, thioethers and pyridines, $Y^-$ is a noncoordinating anion and n is 0, 1, 2, 3, 4 or 5.

In a further embodiment of the process of the invention, it is possible to use a catalyst of the general formula (E),

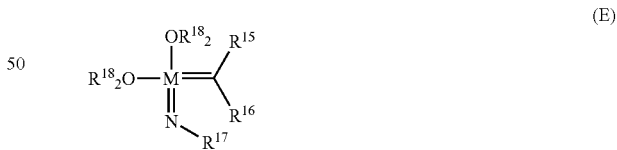

(E)

where $M^2$ is molybdenum or tungsten, $R^{15}$ and $R^{16}$ are identical or different and are each hydrogen, $C_1$-$C_{20}$-alkyl, $C_2$-$C_{20}$-alkenyl, $C_2$-$C_{20}$-alkyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphynyl $R^{17}$ and $R^{18}$ are identical or different and are each a substituted or halogen-substituted $C_1$-$C_{20}$-alkyl, $C_6$-$C_{24}$-aryl, $C_6$-$C_{30}$-aralkyl radical or a silicone-containing analogue thereof.

A further alternative embodiment of the process of the invention comprises the use of a catalyst of the general formula (F),

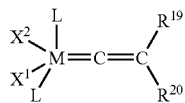
(F)

where
M is ruthenium or osmium,
$X^1$ and $X^2$ are identical or different and are anionic ligands which can have all meanings of $X^1$ and $X^2$ in the general formulae (A) and (B),
the symbols L represent identical or different ligands which can have all general and preferred meanings of L in the general formulae (A) and (B),
$R^{19}$ and $R^{20}$ are identical or different and are each hydrogen or substituted or unsubstituted alkyl.

A further alternative embodiment of the process of the invention comprises the use of a catalyst of the general formula (G), (H) or (K),

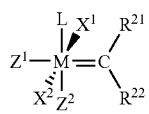
(G)

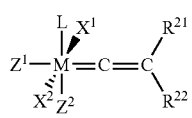
(H)

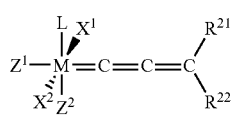
(K)

where
M is osmium or ruthenium,
$X^1$ and $X^2$ are identical or different and are two ligands, preferably anionic ligands,
L is a ligand, preferably an uncharged electron donor,
$Z^1$ and $Z^2$ are identical or different and are uncharged electron donors,
$R^{21}$ and $R^{22}$ are each, independently of one another, hydrogen alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphynyl which may in each case optionally be substituted by one or more radicals selected from among alkyl, halogen, alkoxy, aryl or heteroaryl.

The catalysts of the general formulae (G), (H) and (K) are known in principle, e.g. from WO 2003/011455 A1, WO 2003/087167 A2, Organometallics 2001, 20, 5314 and Angew. Chem. Int. Ed. 2002, 41, 4038. The catalysts are commercially available or can be synthesized by the preparative methods indicated in the abovementioned literature references.

$Z^1$ and $Z^2$

In the catalyst systems which can be used according to the invention, catalysts of the general formulae (G), (H) and (K) in which $Z^1$ and $Z^2$ are identical or different and are uncharged electron donors are used. These ligands are usually weakly coordinating.

The ligands are usually optionally substituted heterocyclic groups. These can be five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the abovementioned groups may in each case optionally be substituted by one or more alkyl, preferably $C_1$-$C_{10}$-alkyl, cycloalkyl, preferably C—, —C-cycloalkyl, alkoxy, preferably $C_1$-$C_{10}$-alkoxy halogen, preferably chlorine or bromine, aryl, preferably $C_6$-$C_{24}$-aryl, or heteroaryl, preferably $C_5$-$C_{23}$-heteroaryl, radicals which may in turn each be substituted by one or more groups, preferably groups selected from the group consisting of halogen, in particular chlorine or bromine, $C_1$-$C_5$-alkyl, $C_1$-$C_5$-alkoxy and phenyl.

Examples of $Z^1$ and $Z^2$ encompass nitrogen-containing heterocycles such as pyridines, pyridazines, bipyridines, pyrimidines, pyrazines, pyrazolidines, pyrrolidines, piperazines, indazoles, quinolines, purines, acridines, bisimidazoles, picolylimines, imidazolidines and pyrroles.

$Z^1$ and $Z^2$ can also be bridged to one another to form a cyclic structure. In this case, $Z^1$ and $Z^2$ form a single bidentate ligand.

L

In the catalysts of the general formulae (G), (H) and (K), L can have the same meanings as L in the general formula (B).

$R^{21}$ and $R^{22}$

In the catalysts of the general formulae (G), (H) and (K), $R^{21}$ and $R^{22}$ are identical or different and are each alkyl, preferably $C_1$-$C_{30}$-alkyl, particularly preferably $C_1$-$C_{20}$-alkyl, cycloalkyl, preferably $C_3$-$C_{20}$-cycloalkyl, particularly preferably $C_3$-$C_8$-cycloalkyl, alkenyl, preferably $C_2$-$C_{20}$-alkenyl, particularly preferably $C_2$-$C_{16}$-alkenyl, alkynyl, preferably $C_2$-$C_{20}$-alkynyl, particularly preferably $C_2$-$C_{16}$-alkynyl, aryl, preferably $C_6$-$C_{24}$-aryl, carboxylate, preferably $C_1$-$C_{20}$-carboxylate, alkoxy, preferably $C_1$-$C_{20}$-alkoxy, alkenyloxy, preferably $C_2$-$C_{20}$-alkenyloxy, alkynyloxy, preferably $C_2$-$C_{20}$-alkynyloxy, aryloxy, preferably $C_6$-$C_{24}$-aryloxy, alkoxycarbonyl, preferably $C_2$-$C_{20}$-alkoxycarbonyl, alkylamino, preferably $C_1$-$C_{30}$-alkylamino, alkylthio, preferably $C_1$-$C_{30}$-alkylthio, arylthio, preferably $C_6$-$C_{24}$-arylthio, alkylsulphonyl, preferably $C_1$-$C_{20}$-alkylsulphonyl, or alkylsulphynyl, preferably $C_1$-$C_{20}$-alkylsulphynyl, where the abovementioned substituents may be substituted by one or more alkyl, halogen, alkoxy, aryl or heteroaryl radicals.

$X^1$ and $X^2$

In the catalysts of the general formulae (G), (H) and (K), $X^1$ and $X^2$ are identical or different and can have the same general, preferred and particularly preferred meanings as indicated above for $X^1$ and $X^2$ in the general formula (A).

Preference is given to using catalysts of the general formulae (G), (H) and (K) in which
M is ruthenium,
$X^1$ and $X^2$ are both halogen, in particular chlorine,
$R^1$ and $R^2$ are identical or different and are five- or six-membered monocyclic groups having from 1 to 4, preferably from 1 to 3 and particularly preferably 1 or 2, heteroatoms or bicyclic or polycyclic structures made up of 2, 3, 4 or 5 five- or six-membered monocyclic groups of this type, where all the above-mentioned groups may in each case be substituted by one or more alkyl, preferably $C_1$-$C_{10}$-alkyl, cycloalkyl, preferably $C_3$-$C_8$-cycloalkyl, alkoxy, preferably $C_1$-$C_{10}$-alkoxy, halogen, preferably chlorine or bromine, aryl, preferably $C_6$-$C_{24}$-aryl, or heteroaryl, preferably $C_5$-$C_{23}$-heteroaryl, radicals, $R^{21}$ and $R^{22}$ are identical or different and are each $C_1$-$C_{30}$-alkyl $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{30}$-alkylamino, $C_1$-$C_{30}$-alkylthio, $C_6$-$C_{24}$-arylthio, $C_1$-$C_{20}$-alkylsulphonyl, $C_1$-$C_{20}$-alkylsulphynyl, and L has a structure of the above-described general formula (IIa) or (IIb), in particular one of the formulae (IIIa) to (IIIf).

A particularly preferred catalyst which comes under the general formula (G) has the structure (XIX),

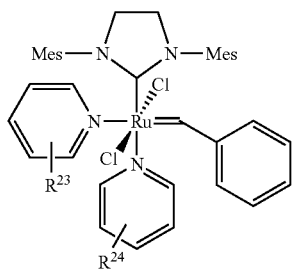

(XIX)

where $R^{23}$ and $R^{24}$ are identical or different and are each halogen, straight-chain or branched $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, dialkylamino, trialkylsilyl or trialkoxysilyl.

The abovementioned radicals $C_1$-$C_{20}$-alkyl, $C_1$-$C_{20}$-heteroalkyl, $C_1$-$C_{10}$-haloalkyl, $C_1$-$C_{10}$-alkoxy, $C_6$-$C_{24}$-aryl, preferably phenyl, formyl, nitro, a nitrogen heterocycle, preferably pyridine, piperidine or pyrazine, carboxy, alkylcarbonyl, halocarbonyl, carbamoyl, thiocarbamoyl, carbamido, thioformyl, amino, trialkylsilyl and trialkoxysilyl may in turn each be substituted by one or more halogen, preferably fluorine, chlorine or bromine, $C_1$-$C_5$-alkyl, $C_1$-$C_5$-alkoxy or phenyl radicals.

Particularly preferred embodiments of the catalyst of the formula (XIX) have the structure (XIX a) or (XIX b), where $R^{23}$ and $R^{24}$ have the same meanings as indicated in the formula (XIX).

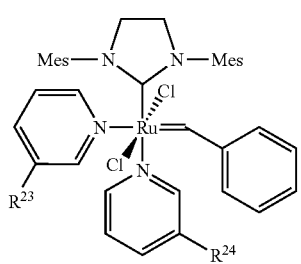

(XIXa)

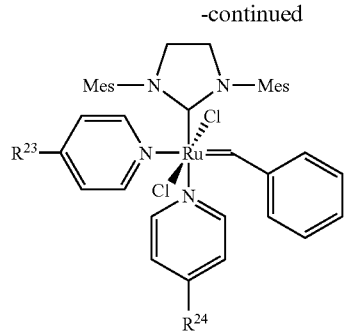

(XIXb)

When $R^{23}$ and $R^{24}$ are each hydrogen, the catalyst is referred to in the literature as the "Grubbs III catalyst".

Further suitable catalysts which come under the general formulae (G), (H) and (K) have the following structural formulae (XX)-(XXXI), where Mes is in each case 2,4,6-trimethylphenyl.

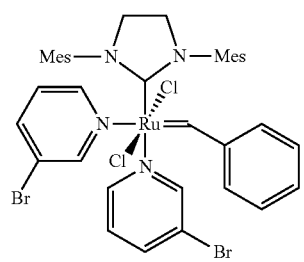

(XX)

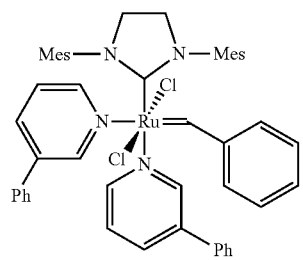

(XXI)

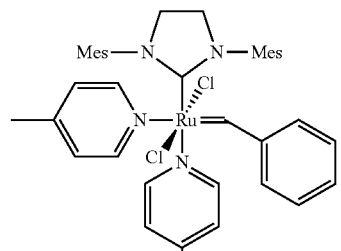

(XXII)

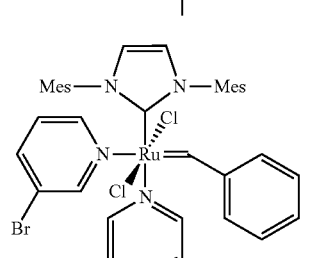

(XXIII)

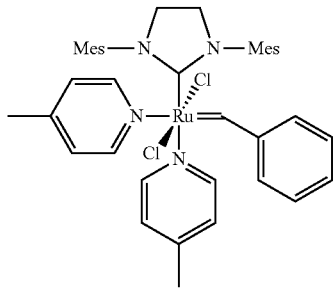 (XXIV)

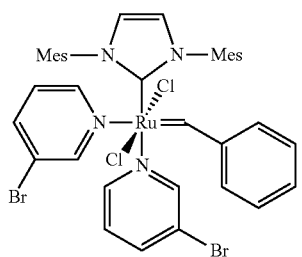 (XXV)

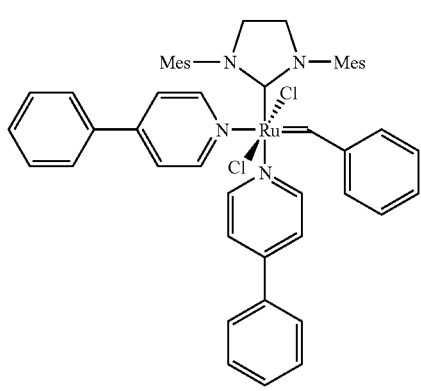 (XXVI)

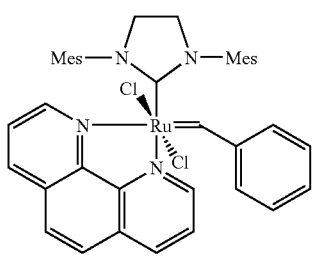 (XXVII)

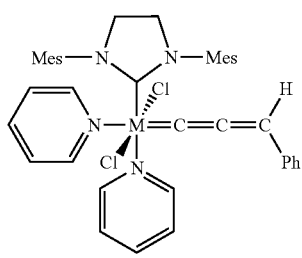 (XXVIII)

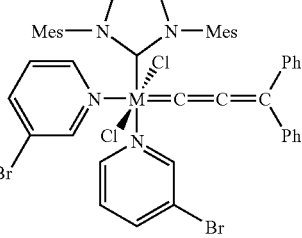 (XXIX)

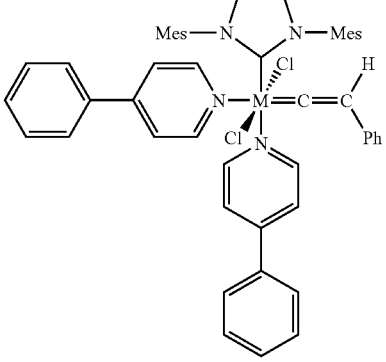 (XXX)

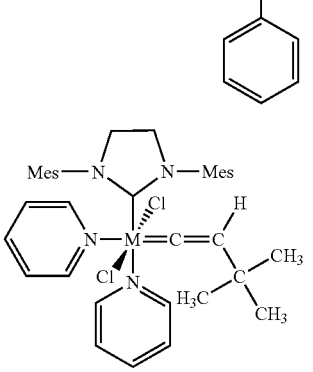 (XXXI)

For use in the process of the invention, the compound of the general formula (I) can be added in a solvent or dispersion medium or else without solvent or dispersion medium to the metathesis catalyst or to a solution of the metathesis catalyst and this mixture can then be brought into contact with the nitrile rubber to be degraded. As an alternative, the compound of the general formula (I) can also be added directly to a solution of the nitrile rubber to be degraded, to which the metathesis catalyst is also added.

As solvent or dispersion medium with the aid of which the compound of the general formula (I) is added to the catalyst or a solution thereof, it is possible to use all known solvents. To achieve the effectiveness of the compound of the general formula (I), it is not absolutely necessary for the compound of the general formula (I) to have a substantial solubility in the solvent. Preferred solvents/dispersion media encompass, but are not restricted to, acetone, benzene, chlorobenzene, chloroform, cyclohexane, dichloromethane, dioxane, dimethylformamide, dimethylacetamide, dimethyl sulphone, dimethyl sulphoxide, methyl ethyl ketone, tetrahydrofuran, tetrahydropyran and toluene. The solvent/dispersion medium is preferably inert towards the metathesis catalyst.

In the process of the invention, the metathesis catalyst and the compound of the general formula (I) are used in a molar ratio of metathesis catalyst to compound of the general formula (I) of from 1:1000 to 1:1, preferably from 1:100 to 1:1, particularly preferably from 1:25 to 1:1.

The amount in which the compound of the general formula (I) is used per amount of nitrile rubber to be degraded is in the range from 0.0005 phr to 5 phr, preferably from 0.005 phr to 2.5 phr (phr=parts by weight per 100 parts by weight of rubber).

The amount of metathesis catalyst based on the nitrile rubber used depends on the nature and the catalytic activity of the specific catalyst. The amount of catalyst used is usually from 1 to 1000 ppm of noble metal, preferably from 2 to 500 ppm, in particular from 5 to 250 ppm, based on the nitrile rubber used.

The NBR metathesis can be carried out in the absence or in the presence of a coolefin. This is preferably a straight-chain or branched $C_2$-$C_{16}$-olefin. Suitable olefins are, for example, ethylene, propylene, isobutene, styrene, 1-hexene and 1-octene. Preference is given to using 1-hexene or 1-octene. If the coolefin is liquid (for example as in the case of 1-hexene), the amount of coolefin is preferably in the range 0.2-20% by weight based on the NBR used. If the coolefin is a gas, for example as in the case of ethylene, the amount of coolefin is preferably selected so that a pressure in the range $1\times10^5$ Pa-$1\times10^7$ Pa, preferably a pressure in the range from $5.2\times10^5$ Pa to $4\times10^6$ Pa, is established in the reaction vessel at room temperature.

The metathesis reaction can be carried out in a suitable solvent which does not deactivate the catalyst used and also does not adversely affect the reaction in any other way. Preferred solvents encompass, but are not restricted to, dichloromethane, benzene, toluene, methyl ethyl ketone, acetone, tetrahydrofuran, tetrahydropyran, dioxane and cyclohexane. The particularly preferred solvent is chlorobenzene. In some case, when the coolefin itself can act as solvent, e.g. in the case of 1-hexene, the addition of a further additional solvent can also be dispensed with.

The concentration of the nitrile rubber used in the reaction mixture of the metathesis is not critical, but it naturally has to be noted that the reaction should not be adversely affected by an excessively high viscosity of the reaction mixture and the mixing problems associated therewith. The concentration of the NBR in the reaction mixture is preferably in the range from 1 to 25% by weight, particularly preferably in the range from 5 to 20% by weight, based on the total reaction mixture.

The metathetic degradation is usually carried out at a temperature in the range from 10° C. to 150° C., preferably at a temperature in the range from 20 to 100° C.

The reaction time depends on a number of factors, for example on the type of NBR, on the type of catalyst, on the catalyst concentration employed and on the reaction temperature. The reaction is typically complete within five hours under normal conditions. The progress of the metathesis can be monitored by standard analytical methods, e.g. by GPC measurements or by determination of the viscosity.

As nitrile rubbers ("NBR"), it is possible to use copolymers or terpolymers which contain repeating units of at least one conjugated diene, at least one α,β-unsaturated nitrile and, if appropriate, one or more further copolymerizable monomers in the metathesis reaction.

The conjugated diene can be of any nature. Preference is given to using ($C_4$-$C_6$)-conjugated dienes. Particular preference is given to 1,3-butadiene, isoprene, 2,3-dimethylbutadiene, piperylene or mixtures thereof. In particular, use is preferably made of 1,3-butadiene or isoprene or mixtures thereof. Very particular preference is given to 1,3-butadiene.

As α,β-unsaturated nitrite, it is possible to use any known α,β-unsaturated nitrite, with preference being given to ($C_3$-$C_5$)-α,β-unsaturated nitrites such as acrylonitrile, methacrylonitrile, ethacrylonitrile or mixtures thereof. Particularly preference is given to acrylonitrile.

A particularly preferred nitrile rubber is thus a copolymer of acrylonitrile and 1,3-butadiene.

In addition to the conjugated diene and the α,β-unsaturated nitrite, it is possible to use one or more further copolymerizable monomers known to those skilled in the art, e.g. α,β-unsaturated monocarboxylic or dicarboxylic acids, their esters or amides. As α,β-unsaturated monocarboxylic or dicarboxylic acids, preference is given to fumaric acid, maleic acid, acrylic acid and methacrylic acid. As esters of α,β-unsaturated carboxylic acids, preference is given to using their alkyl esters and alkoxyalkyl esters. Particularly preferred alkyl esters of α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of α,β-unsaturated carboxylic acids are methoxyethyl (meth)acrylate, ethoxyethyl (meth)acrylate and methoxyethyl (meth)acrylate. It is also possible to use mixtures of alkyl esters, e.g. those mentioned above, with alkoxyalkyl esters, e.g. in the form of those mentioned above.

The proportions of conjugated diene and α,β-unsaturated nitrile in the NBR polymers to be used can vary within wide ranges. The proportion of the conjugated diene or the sum of conjugated dienes is usually in the range from 40 to 90% by weight, preferably in the range from 60 to 85% by weight, based on the total polymer. The proportion of the α,β-unsaturated nitrite or the sum of the α,β-unsaturated nitrites is usually from 10 to 60% by weight, preferably from 15 to 40% by weight, based on the total polymer. The proportions of the monomers in each case add up to 100% by weight. The additional monomers can be present in amounts of from 0 to 40% by weight, preferably from 0.1 to 40% by weight, particularly preferably from 1 to 30% by weight, based on the total polymer. In this case, corresponding proportions of the conjugated diene or dienes and/or the α,β-unsaturated nitrite or nitrites are replaced by the proportions of the additional monomers, with the proportions of all monomers in each case adding up to 100% by weight.

The preparation of nitrite rubbers by polymerization of the abovementioned monomers is adequately known to those skilled in the art and is comprehensively described in the polymer literature.

Nitrite rubbers which can be used for the purposes of the invention are also commercially available, e.g. as products from the product range of the grades Perbunan® and Krynac® of Lanxess Deutschland GmbH.

The nitrite rubbers used for the metathesis have a Mooney viscosity (ML 1+4 at 100° C.) in the range from 30 to 70, preferably from 30 to 50. This corresponds to a weight average molecular weight $M_w$ in the range 150 000-500 000, preferably in the range 180 000-400 000. Furthermore, the nitrite rubbers used have a polydispersity PDI=$M_w/M_n$, where $M_w$ is the weight average molecular weight and $M_n$ is the number average molecular weight, in the range 2.0-6.0 and preferably in the range 2.0-4.0.

The determination of the Mooney viscosity is carried out in accordance with ASTM standard D 1646.

The nitrite rubbers obtained by the metathesis process of the invention have a Mooney viscosity (ML 1+4 at 100° C.) in the range 5-30, preferably 5-20. This corresponds to a weight average molecular weight $M_w$ in the range 10 000-100 000, preferably in the range 10 000-80 000. Furthermore, the nitrite rubbers obtained have a polydispersity PDI=$M_w/M_n$, where $M_n$ is the number average molecular weight, in the range 1.4-4.0, preferably in the range 1.5-3.

The metathetic degradation in the presence of the catalyst system according to the invention can be followed by a hydrogenation of the degraded nitrile rubbers obtained. This can be carried out in the manner known to those skilled in the art.

The hydrogenation can be carried out using homogeneous or heterogeneous hydrogenation catalysts. It is also possible to carry out the hydrogenation in situ, i.e. in the same reaction vessel in which the metathetic degradation has previously taken place and without the need to isolate the degraded nitrile rubber. The hydrogenation catalyst is simply introduced into the reaction vessel.

The catalysts used are usually based on rhodium, ruthenium or titanium, but it is also possible to use platinum, iridium, palladium, rhenium, ruthenium, osmium, cobalt or copper either as metal or preferably in the form of metal compounds (see, for example, U.S. Pat. No. 3,700,637, DE-A-25 39 132, EP-A-0 134 023, DE-OS-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in the homogeneous phase are described below and are also known from DE-A-25 39 132 and EP-A-0 471 250.

The selective hydrogenation can, for example, be achieved in the presence of a rhodium- or ruthenium-containing catalyst. It is possible to use, for example, a catalyst of the general formula $(R^1{}_m B)_l M X_n$ where M is ruthenium or rhodium, the radicals $R^1$ are identical or different and are each a $C_1$-$C_8$-alkyl group, a $C_4$-$C_8$-cycloalkyl group, a $C_6$-$C_{15}$-aryl group or a $C_7$-$C_{15}$-aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride and also tetrakis(triphenylphosphine)rhodium hydride of the formula $(C_6H_5)_3P)_4RhH$ and the corresponding compounds in which all or part of the triphenylphosphine has been replaced by tricyclohexylphosphine. The catalyst can be used in small amounts. An amount in the range 0.01-1% by weight, preferably in the range 0.03-0.5% by weight and particularly preferably in the range 0.1-0.3% by weight, based on the weight of the polymer, is suitable.

It is usually useful to use the catalyst together with a cocatalyst which is a ligand of the formula $R^1{}_m B$, where $R^1$, m and B are as defined above for the catalyst. Preference is given to m being 3, B being phosphorus and the radicals $R^1$ can be identical or different. The cocatalysts preferably have trialkyl, tricycloalkyl, triaryl, triaralkyl, diarylmonoalkyl, diarylmonocycloalkyl, dialkylmonoaryl, dialkylmonocycloalkyl, dicycloalkylmonoaryl or dicycloalkylmonoaryl radicals.

Examples of cocatalysts may be found, for example, in U.S. Pat. No. 4,631,315. A preferred cocatalyst is triphenylphosphine. The cocatalyst is preferably used in amounts in the range 0.3-5% by weight, preferably in the range 0.5-4% by weight, based on the weight of the nitrile rubber to be hydrogenated. Furthermore, the weight ratio of the rhodium-containing catalyst to the cocatalyst is preferably in the range from 1:3 to 1:55, particularly preferably in the range from 1:5 to 1:45. Based on 100 parts by weight of the nitrile rubber to be hydrogenated, it is appropriate to use from 0.1 to 33 parts by weight of the cocatalyst, preferably from 0.5 to 20 parts by weight and very particularly preferably from 1 to 5 parts by weight, in particular more than 2 but less than 5 parts by weight, of cocatalyst.

The practical procedure for carrying out this hydrogenation is adequately known to those skilled in the art from U.S. Pat. No. 6,683,136. The nitrile rubber to be hydrogenated is usually treated in a solvent such as toluene or monochlorobenzene with hydrogen at a temperature in the range from 100 to 150° C. and a pressure in the range from 50 to 150 bar for from 2 to 10 hours.

For the purposes of the present invention, hydrogenation is a reaction of at least 50%, preferably 70-100%, particularly preferably 80-100%, of the double bonds present in the starting nitrile rubber.

When heterogeneous catalysts are used, these are usually supported catalysts based on palladium which are supported, for example, on carbons, silica, calcium carbonate or barium sulphate.

After the hydrogenation is complete, a hydrogenated nitrile rubber having a Mooney viscosity (ML 1+4 at 100° C.), measured in accordance with ASTM standard D 1646, in the range 10-50, preferably from 10 to 30, is obtained. This corresponds to a weight average molecular weight $M_w$ in the range 2000-400 000 g/mol, preferably in the range 20000-200 000. Furthermore, the hydrogenated nitrile rubbers obtained have a polydispersity $PDI=M_w/M_n$, where $M_w$ is the weight average molecular weight and $M_n$ is the number average molecular weight, in the range 1-5 and preferably in the range 1.5-3.

EXAMPLES

In the series of experiments below, the following catalysts were used:

| Name of catalyst | Structural formula | Molecular weight Mw [g/mol] | Source |
|---|---|---|---|
| Grubbs II catalyst | 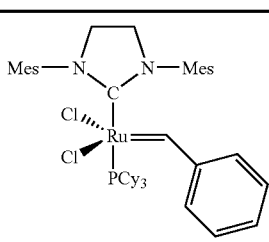 | 848.33 | Materia/Pasadena; USA |

-continued

| Name of catalyst | Structural formula | Molecular weight Mw [g/mol] | Source |
|---|---|---|---|
| Grubbs-Hoveyda catalyst | | 626.14 | Materia/Pasadena; USA |
| Grela catalyst | | 671.13 | Prepared as described in J. Org. Chem. 2004, 69, 6894-6896 |
| Nolan catalyst | | 949.37 | Umicore S.A./Brussels, Belgium |

The experiments were carried out using the following catalyst additives which were all procured from Acros Organics:

| Name of the catalyst additive | Structural formula | Molar weight [g/mol] |
|---|---|---|
| Tetraisopropoxytitanate | Ti(OC$_3$H$_7$)$_4$ | 284.26 |
| Tetra-tert-butoxytitanate | Ti(OC$_4$H$_9$)$_4$ | 340.33 |
| Tetra-n-butoxytitanate | Ti(OC$_4$H$_9$)$_4$ | 340.35 |
| Tetraethoxytitanate | Ti(OC$_2$H$_5$)$_4$ | 228.13 |
| Tetraethoxyniobate | Nb(OC$_2$H$_5$)$_5$ | 318.21 |
| Tetraethoxytantalate | Ta(OC$_2$H$_5$)$_5$ | 406.25 |
| Tetra-tert-butoxyzirconate | Zr(OC$_2$H$_5$)$_4$ | 383.68 |

Nitrile Rubber Used:

The degradation reactions described in the series of experiments below were carried out using the nitrile rubber Perbunan® NT 3435 from Lanxess Deutschland GmbH. This nitrile rubber had the following characteristic properties:

| | |
|---|---|
| Acrylonitrile content: | 34.6% by weight |
| Mooney viscosity (ML 1 + 4 @ 100° C.): | 33 Mooney units |
| Residual moisture content: | 0.9% by weight |
| $M_w$: | 204 000 g/mol |
| $M_n$: | 89 000 g/mol |
| PDI ($M_w/M_n$): | 2.3 |

Procedure for Carrying out the Metathesis:

To carry out the metathesis, the nitrile rubber was dissolved in chlorobenzene over a period of 12 hours (12% by weight; the precise amounts of the nitrile rubber and of the chlorobenzene are indicated in the tables for the series of experiments below). 1-Hexene, the respective Lewis acid and the catalyst were then added in succession. The reaction temperature was 20° C. The metathesis reaction was stopped by means of ethyl vinyl ether for at least 30 minutes GPC Sample Preparation:

To car out the molecular weight determination by means of GPC, 100 mg of sample of the nitrile rubber obtained after the metathesis were dissolved in 3.5 ml of N,N'-dimethylacetamide (stabilized with LiBr, 0.075M). The solution was subsequently filtered by means of a syringe filter (pore size: 0.2 μm).

GPC Measurement:

| | |
|---|---|
| Pump: | Waters Mod. 510 |
| RI detector: | Waters Model 410 Differential Refractometer |
| Flow rate: | 1 ml/min |
| Eluent: | N,N'-Dimethylacetamide |
| Temperature: | 80° C. |
| column set: | 2x Resipore 300 × 7.5 mm, pore size: 3 μm |
| Calibration standard: | PS (Polymer Standard Service); having molar masses from 960 to 6 × 10$^5$ g/mol. |

Overview of the Series of Experiments Carried Out:

| Experiments | Catalyst | Additive | Molar ratio (catalyst: additive) |
|---|---|---|---|
| 1.1 | Grubbs II | — | — |
| 1.2 | Grubbs II | Tetraisopropoxytitanate | 1/1000 |
| 1.3 | Grubbs II | Tetraisopropoxytitanate | 1/500 |
| 1.4 | Grubbs II | Tetraisopropoxytitanate | 1/200 |
| 1.5 | Grubbs II | Tetraisopropoxytitanate | 1/70 |
| 1.6 | Grubbs II | Tetraisopropoxytitanate | 1/22 |
| 1.7 | Grubbs II | Tetraisopropoxytitanate | 1/11 |
| 1.8 | Grubbs II | Tetraisopropoxytitanate | 1/5 |
| 1.9 | Grubbs II | Tetra-tert-butoxytitanate | 1/22 |
| 1.10 | Grubbs II | Tetra-n-butoxytitanate | 1/22 |
| 1.11 | Grubbs II | Tetraethoxytitanate | 1/22 |
| 1.12 | Grubbs II | Tetraethoxyniobate | 1/22 |
| 1.13 | Grubbs II | Tetraethoxytantalate | 1/22 |
| 1.14 | Grubbs II | Tetra-tert-butoxyzirconate | 1/22 |
| 2.1 | Grubbs-Hoveyda | — | — |
| 2.2 | Grubbs-Hoveyda | Tetraisopropoxytitanate | 1/22 |
| 3.1 | Grela | — | — |
| 3.2 | Grela | Tetraisopropoxytitanate | 1/22 |
| 4.1 | Nolan | — | — |
| 4.2 | Nolan | Tetraisopropoxytitanate | 1/22 |

Series 1: Grubbs II Catalyst

Experiment 1.1

| NBR | Grubbs II catalyst | | 1-Hexene | | Additive | |
|---|---|---|---|---|---|---|
| Amount [g] | Amount [mg] | Based on NBR [phr] | Amount [g] | Based on NBR [phr] | Type | Amount [g] |
| 40 | 20 | 0.05 | 0.8 | 2.0 | — | — |

| Time [min.] | Mw [kg/mol] | Mn [kg/mol] | PDI |
|---|---|---|---|
| 0 | 204 | 89 | 2.3 |
| 30 | 91 | 51 | 1.8 |
| 60 | 77 | 48 | 1.6 |
| 185 | 56 | 36 | 1.6 |
| 425 | 52 | 29 | 1.8 |

Experiment 1.2

| NBR | Grubbs II catalyst | | 1-Hexene | | Additive | |
|---|---|---|---|---|---|---|
| Amount [g] | Amount [mg] | Based on NBR [phr] | Amount [g] | Based on NBR [phr] | Type | Amount [g] |
| 40 | 20 | 0.05 | 0.8 | 2.0 | Ti(IV) isopropoxide | 6.7 |

| Time [min.] | Mw [kg/mol] | Mn [kg/mol] | PDI |
|---|---|---|---|
| 0 | 204 | 89 | 2.3 |
| 30 | — | — | — |
| 60 | — | — | — |
| 185 | 37 | 21 | 1.7 |
| 425 | 21 | 13 | 1.6 |

Experiment 1.3

| NBR | Grubbs II catalyst | | 1-Hexene | | Additive | |
|---|---|---|---|---|---|---|
| Amount [g] | Amount [mg] | Based on NBR [phr] | Amount [g] | Based on NBR [phr] | Type | Amount [g] |
| 40 | 20 | 0.05 | 0.8 | 2.0 | Ti(IV) isopropoxide | 3.35 |

| Time [min.] | Mw [kg/mol] | Mn [kg/mol] | PDI |
|---|---|---|---|
| 0 | 204 | 89 | 2.3 |
| 30 | — | — | — |
| 60 | — | — | — |
| 185 | 37 | 21 | 1.8 |
| 425 | 22 | 11 | 2.0 |

Experiment 1.4

| NBR | Grubbs II catalyst | | 1-Hexene | | Additive | |
|---|---|---|---|---|---|---|
| Amount [g] | Amount [mg] | Based on NBR [phr] | Amount [g] | Based on NBR [phr] | Type | Amount [g] |
| 40 | 20 | 0.05 | 0.8 | 2.0 | Ti(IV) isopropoxide | 1.34 |

| Time [min.] | Mw [kg/mol] | Mn [kg/mol] | PDI |
|---|---|---|---|
| 0 | 204 | 89 | 2.3 |
| 30 | 91 | 42 | 2.2 |
| 60 | 64 | 30 | 2.1 |
| 185 | 24 | 11 | 2.2 |
| 425 | 17 | 9 | 1.9 |

Experiment 1.5

| NBR | Grubbs II catalyst | | 1-Hexene | | Additive | |
|---|---|---|---|---|---|---|
| Amount [g] | Amount [mg] | Based on NBR [phr] | Amount [g] | Based on NBR [phr] | Type | Amount [g] |
| 40 | 20 | 0.05 | 0.8 | 2.0 | Ti(IV) isopropoxide | 0.46 |

| Time [min.] | Mw [kg/mol] | Mn [kg/mol] | PDI |
|---|---|---|---|
| 0 | 204 | 89 | 2.3 |
| 30 | — | — | — |
| 60 | 72 | 38 | 1.9 |
| 185 | 32 | 20 | 1.6 |
| 425 | 24 | 15 | 1.6 |

Experiment 1.6

| NBR Amount [g] | Grubbs II catalyst Amount [mg] | Grubbs II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Ti(IV) isopropoxide | 0.15 |

| Time [min.] | Mw [kg/mol] | Mn [kg/mol] | PDI |
|---|---|---|---|
| 0 | 204 | 89 | 2.3 |
| 30 | — | — | — |
| 60 | 59 | 33 | 1.8 |
| 185 | 27 | 15 | 1.8 |
| 425 | 18 | 11 | 1.7 |

Experiment 1.7

| NBR Amount [g] | Grubbs II catalyst Amount [mg] | Grubbs II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Ti(IV) isopropoxide | 0.074 |

| Time [min.] | Mw [kg/mol] | Mn [kg/mol] | PDI |
|---|---|---|---|
| 0 | 204 | 89 | 2.3 |
| 30 | — | — | — |
| 60 | — | — | — |
| 185 | 51 | 29 | 1.8 |
| 425 | 30 | 18 | 1.7 |

Experiment 1.8

| NBR Amount [g] | Grubbs II catalyst Amount [mg] | Grubbs II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Ti(IV) isopropoxide | 0.034 |

| Time [min.] | Mw [kg/mol] | Mn [kg/mol] | PDI |
|---|---|---|---|
| 0 | 204 | 89 | 2.3 |
| 30 | — | — | — |
| 60 | 76 | 39 | 2.0 |
| 185 | 40 | 18 | 2.2 |
| 425 | 30 | 14 | 2.1 |

Experiment 1.9

| NBR Amount [g] | Grubbs II catalyst Amount [mg] | Grubbs II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Ti(IV) tert-butoxide | 0.178 |

| Time [min.] | Mw [kg/mol] | Mn [kg/mol] | PDI |
|---|---|---|---|
| 0 | 204 | 89 | 2.3 |
| 30 | — | — | — |
| 60 | 72 | 42 | 1.7 |
| 185 | 35 | 22 | 1.6 |
| 425 | 23 | 13 | 1.7 |

Experiment 1.10

| NBR Amount [g] | Grubbs II catalyst Amount [mg] | Grubbs II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Ti(IV) n-butylate | 0.178 |

| Time [min.] | Mw [kg/mol] | Mn [kg/mol] | PDI |
|---|---|---|---|
| 0 | 204 | 89 | 2.3 |
| 30 | — | — | — |
| 60 | — | — | — |
| 185 | 40 | 22 | 1.8 |
| 425 | 30 | 16 | 1.9 |

Experiment 1.11

| NBR Amount [g] | Grubbs-II catalyst Amount [mg] | Grubbs-II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Ti(IV) ethoxide | 0.119 |

| Time [min.] | Mw [kg/mol] | Mn [kg/mol] | PDI |
|---|---|---|---|
| 0 | 204 | 89 | 2.3 |
| 30 | — | — | — |
| 60 | 56 | 27 | 2.1 |
| 185 | 29 | 14 | 2.1 |
| 425 | 19 | 10 | 1.9 |

Experiment 1.12

| NBR Amount [g] | Grubbs II catalyst Amount [mg] | Grubbs II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Nb(V) ethoxide | 0.166 |

| Time [min.] | Mw [kg/mol] | Mn [kg/mol] | PDI |
|---|---|---|---|
| 0 | 204 | 89 | 2.3 |
| 30 | — | — | — |
| 60 | 70 | 29 | 2.5 |
| 185 | 32 | 16 | 2.0 |
| 425 | 20 | 10 | 1.9 |

Experiment 1.13

| NBR Amount [g] | Grubbs II catalyst Amount [mg] | Grubbs II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Ta(V) ethoxide | 0.212 |

| Time [min.] | Mw [kg/mol] | Mn [kg/mol] | PDI |
|---|---|---|---|
| 0 | 204 | 89 | 2.3 |
| 30 | — | — | — |
| 60 | 71 | 36 | 2.0 |
| 185 | 33 | 15 | 2.2 |
| 425 | 22 | 10 | 2.1 |

Experiment 1.14

| NBR Amount [g] | Grubbs II catalyst Amount [mg] | Grubbs II catalyst Based on NBR [phr] | 1-Hexene Amount [g] | 1-Hexene Based on NBR [phr] | Additive Type | Additive Amount [g] |
|---|---|---|---|---|---|---|
| 40 | 20 | 0.05 | 0.8 | 2.0 | Zr(IV) tert-butoxide | 0.201 |

| Time [min.] | Mw [kg/mol] | Mn [kg/mol] | PDI |
|---|---|---|---|
| 0 | 204 | 89 | 2.3 |
| 30 | — | — | — |
| 60 | — | — | — |
| 185 | 45 | 23 | 1.9 |
| 425 | 35 | 16 | 2.2 |

Series 2: Grubbs-Hoveyda Catalyst

Experiment 2.1

| NBR Amount [g] | Grubbs-Hoveyda catalyst Amount [mg] | Grubbs-Hoveyda catalyst Based on NBR [phr] | 1-Hexene Amount [g] | 1-Hexene Based on NBR [phr] | Additive Type | Additive Amount [g] |
|---|---|---|---|---|---|---|
| 40 | 8 | 0.02 | 0.8 | 2.0 | — | — |

| Time [min.] | Mw [kg/mol] | Mn [kg/mol] | PDI |
|---|---|---|---|
| 0 | 204 | 89 | 2.3 |
| 30 | 100 | 48 | 2.1 |
| 60 | 83 | 43 | 1.9 |
| 185 | 86 | 48 | 1.8 |
| 425 | 82 | 47 | 1.7 |

Experiment 2.2

| NBR Amount [g] | Grubbs-Hoveyda catalyst Amount [mg] | Grubbs-Hoveyda catalyst Based on NBR [phr] | 1-Hexene Amount [g] | 1-Hexene Based on NBR [phr] | Additive Type | Additive Amount [g] |
|---|---|---|---|---|---|---|
| 40 | 8 | 0.02 | 0.8 | 2.0 | Ti(IV) isopropoxide | 0.081 |

| Time [min.] | Mw [kg/mol] | Mn [kg/mol] | PDI |
|---|---|---|---|
| 0 | 204 | 89 | 2.3 |
| 30 | 71 | 41 | 1.7 |
| 60 | 59 | 34 | 1.7 |
| 185 | 54 | 32 | 1.7 |
| 425 | 51 | 29 | 1.8 |

Series 3: Grela Catalyst

Experiment 3.1

| NBR Amount [g] | Grela catalyst Amount [mg] | Grela catalyst Based on NBR [phr] | 1-Hexene Amount [g] | 1-Hexene Based on NBR [phr] | Additive Type | Additive Amount [g] |
|---|---|---|---|---|---|---|
| 40 | 15.8 | 0.040 | 0.8 | 2.0 | — | — |

| Time [min.] | Mw [kg/mol] | Mn [kg/mol] | PDI |
|---|---|---|---|
| 0 | 204 | 89 | 2.3 |
| 30 | 49 | 34 | 1.4 |
| 60 | 48 | 31 | 1.6 |
| 185 | 48 | 29 | 1.6 |
| 425 | 50 | 29 | 1.7 |

Experiment 3.2

| NBR | Grela catalyst | | 1-Hexene | | Additive | |
|---|---|---|---|---|---|---|
| Amount [g] | Amount [mg] | Based on NBR [phr] | Amount [g] | Based on NBR [phr] | Type | Amount [g] |
| 40 | 15.8 | 0.0395 | 0.8 | 2.0 | Ti(IV) isopropoxide | 0.149 |

| Time [min.] | Mw [kg/mol] | Mn [kg/mol] | PDI |
|---|---|---|---|
| 0 | 204 | 89 | 2.3 |
| 30 | 26 | 16 | 1.6 |
| 60 | 22 | 15 | 1.5 |
| 185 | 15 | 9 | 1.6 |
| 425 | 12 | 7 | 1.6 |

Series 4: Nolan Catalyst

Experiment 4.1

| NBR | Nolan catalyst | | 1-Hexene | | Additive | |
|---|---|---|---|---|---|---|
| Amount [g] | Amount [mg] | Based on NBR [phr] | Amount [g] | Based on NBR [phr] | Type | Amount [g] |
| 40 | 44.8 | 0.11 | 0.8 | 2.0 | — | — |

| Time [min.] | Mw [kg/mol] | Mn [kg/mol] | PDI |
|---|---|---|---|
| 0 | 204 | 89 | 2.3 |
| 60 | 111 | 51 | 2.2 |
| 185 | 86 | 45 | 1.9 |
| 425 | 86 | 45 | 1.9 |

Experiment 4.2

| NBR | Nolan catalyst | | 1-Hexene | | Additive | |
|---|---|---|---|---|---|---|
| Amount [g] | Amount [mg] | Based on NBR [phr] | Amount [g] | Based on NBR [phr] | Type | Amount [g] |
| 40 | 44.8 | 0.11 | 0.8 | 2.0 | Ti(IV) isopropoxide | 296.5 |

| Time [min.] | Mw [kg/mol] | Mn [kg/mol] | PDI |
|---|---|---|---|
| 0 | 204 | 89 | 2.3 |
| 60 | — | — | — |
| 185 | — | — | — |
| 425 | 57 | 31 | 1.9 |

What is claimed is:

1. A process for reducing the molecular weight of nitrile rubber comprising bringing a nitrile rubber into contact with a metathesis catalyst which is a complex catalyst based on a metal of transition group 6 or 8 of the Periodic Table and which has at least one ligand bound in a carbene-like fashion to the metal and also a compound of the general formula (I)

$$M(OZ)_m \quad (I)$$

where
M is a transition metal of transition group 4, 5 or 6 of the Period Table of the Elements,
m is 4, 5 or 6 and
the radicals Z are identical or different and are each a linear, branched, aliphatic, cyclic, heterocyclic or aromatic radical which has 1-32 carbon atoms and may additionally have from 1 to 15 heteroatoms.

2. The process according to claim 1, wherein a compound of the general formula (I) in which M is titanium, zirconium, hafnium, vanadium, niobium, tantalum, chromium, molybdenum or tungsten is used.

3. The process according to claim 1 or 2, wherein a compound of the general formula (I) in which Z has 1-32 carbon atoms and can additionally have from 1 to 15 heteroatoms, and is straight-chain or branched $C_1$-$C_{30}$-alkyl, $C_3$-$C_{20}$-cycloalkyl, $C_2$-$C_{20}$-alkenyl, $C_2$-$C_{20}$-alkynyl, a radical of the general formula $(-CHZ^1-CHZ^1-A^2-)_p-CH_2-CH_3$, where p is an integer from 1 to 10, the radicals $Z^1$ are identical or different and are each hydrogen or methyl, with the radicals $Z^1$ located on adjacent carbon atoms preferably being different, and $A^2$ is oxygen, sulphur or —NH, a $C_6$-$C_{24}$-aryl, or a $C_4$-$C_{23}$-heteroaryl radical having at least 1 heteroatom, is used.

4. The process according to claim 1, wherein a compound of the general formula (I) is used in which
M is titanium, zirconium, hafnium, vanadium, niobium, tantalum, chromium, molybdenum or tungsten,
m is 4, 5 or 6 and
Z is methoxide, ethoxide, n-propoxide, i-propoxide, n-butoxide, i-butoxide, tert-butoxide, n-pentoxide, i-pentoxide, tert-pentoxide, dodecanoate, oleate, phenoxide or sterically hindered phenoxide.

5. The process according to claim 1, wherein tetraethoxytitanate, tetra isopropyloxytitanate, tetra-tert-butyloxytitanate, tetra-tert-butyloxyzirconate, pentaethoxyniobate or pentaethoxytantalate is used as compound of the general formula (I).

6. The process according to claim 1 or 5, wherein a compound of the general formula (A),

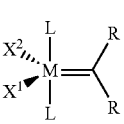

(A)

where
M is osmium or ruthenium,
$X^1$ and $X^2$ are identical or different and are two ligands,
the symbols L represent identical or different ligands,
radicals R are identical or different and are each hydrogen, alkyl, cycloalkyl, alkenyl, alkynyl, aryl, carboxylate, alkoxy, alkenyloxy, alkynyloxy, aryloxy, alkoxycarbonyl, alkylamino, alkylthio, arylthio, alkylsulphonyl, or alkylsulphynyl, where these radicals may in each case be substituted by one or more alkyl, halogen, alkoxy, aryl or heteroaryl radicals or, as an alternative, the two radicals R together with the common carbon atom to which they are bound are bridged to form a cyclic group which can be aliphatic or aromatic in nature, may be substituted and may contain one or more heteroatoms, is used as catalyst.

7. The process according to claim 6, wherein $X^1$ and $X^2$ are identical or different and are each hydrogen, halogen, pseudohalogen, straight-chain or branched $C_1$-$C_{30}$-alkyl, $C_6$-$C_{24}$-aryl, $C_1$-$C_{20}$-alkoxy, $C_6$-$C_{24}$-aryloxy, $C_3$-$C_{20}$-alkyldiketonate, $C_6$-$C_{24}$-aryldiketonate, $C_1$-$C_{20}$-carboxylate, $C_1$-$C_{20}$-alkylsulphonate, $C_6$-$C_{24}$-arylsulphonate, $C_1$-$C_{20}$-alkylthiol, $C_6$-$C_{24}$-arylthiol, $C_1$-$C_{20}$-alkylsulphonyl or $C_1$-$C_{20}$-alkylsulphynyl radicals.

8. The process according to claim 6, wherein $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

9. The process according to claim 6, wherein the two ligands L are each, independently of one another, a phosphine, sulphonated phosphine, phosphate, phosphinite, phosphonite, arsine, stibine, ether, amine, amide, sulphoxide, carboxyl, nitrosyl, pyridine, thioether or imidazolidine ("Im") ligand.

10. The process according to claim 9, wherein the imidazolidine radical (Im) has a structure of the general formula (IIa) or (IIb)

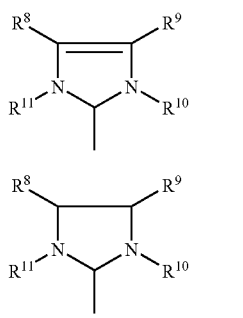

where $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{20}$-aryloxy, $C_2$-$C_{20}$-alkoxycarbonyl, $C_1$-$C_{20}$-alkylthio, $C_6$-$C_{20}$-arylthio, $C_1$-$C_{20}$-alkylsulphonyl, $C_1$-$C_{20}$-alkylsulphonate, $C_6$-$C_{20}$-arylsulphonate or $C_1$-$C_{20}$-alkylsulphinyl and these radicals can, independently of one another, be substituted by one or more substituents, preferably straight-chain or branched $C_1$-$C_{10}$-alkyl, $C_3$-$C_8$-cycloalkyl, $C_1$-$C_{10}$-alkoxy or $C_6$-$C_{24}$-aryl, where these abovementioned substituents may in turn be substituted by one or more radicals.

11. The process according to claim 1 or 5, wherein a compound of the general formula (A1),

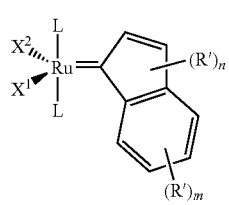

where $X^1$, $X^2$ and L can have the same general, preferred and particularly preferred meanings as mentioned in the general formula (A) in claims 6-11, n is 0, 1 or 2, m is 0, 1, 2, 3 or 4 and the radicals R' are identical or different and are alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radicals which may in each case be substituted by one or more alkyl, halogen, alkoxy, aryl or heteroaryl radicals, is used as catalyst.

12. The process according to claim 1 or 5, wherein the catalyst has the structure (IV), (V) or (VI), where Cy is in each case cyclohexyl, Mes is 2,4,6-trimethylphenyl and Ph is phenyl

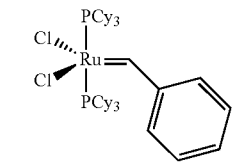

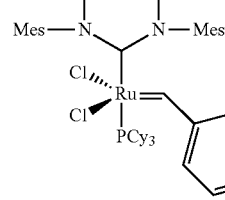

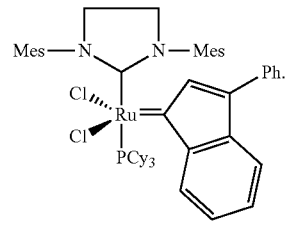

13. The process according to claim 1 or 5, wherein a catalyst of the general formula (B),

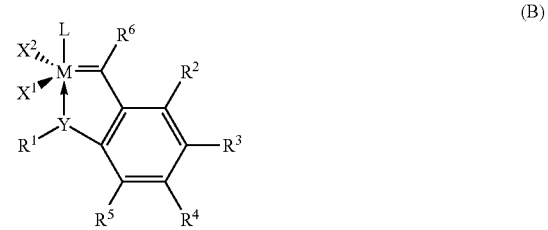

where

M is ruthenium or osmium,

Y is oxygen (O), sulphur (S), an N—$R^1$ radical or a P—$R^1$ radical, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radical which may in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, $R^6$ is hydrogen or an alkyl, alkenyl, alkynyl or aryl radical and L is a ligand, is used.

14. The process according to claim 13, wherein L is a $P(R^7)_3$ radical, where the radicals $R^7$ are each, independently of one another, $C_1$-$C_6$-alkyl, $C_3$-$C_8$-cycloalkyl or aryl, or else a substituted or unsubstituted imidazolidine radical ("Im").

15. The process according to claim 13, wherein L is a $P(R^7)_3$ radical, where the radicals $R^7$ are each, independently of one another, $C_1$-$C_6$-alkyl, $C_3$-$C_8$-cycloalkyl or aryl, or else a substituted or unsubstituted imidazolidine radical ("Im") which has the structure one of the following structures (IIIa) to (IIIf), where Mes is in each case 2,4,6-trimethylphenyl or alternatively in each case a 2,6-diisopropyl phenyl radical

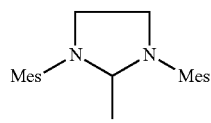
(IIIa)

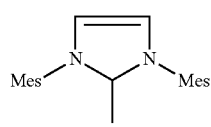
(IIIb)

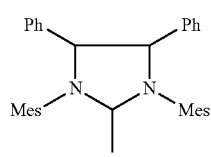
(IIIc)

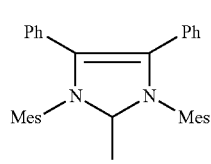
(IIId)

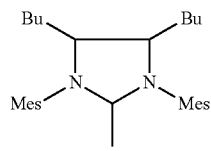
(IIIe)

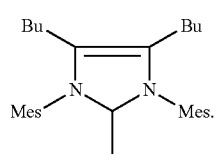
(IIIf)

16. The process according to claim 13, wherein $X^1$ and $X^2$ are identical and are each halogen, in particular chlorine, $CF_3COO$, $CH_3COO$, $CFH_2COO$, $(CH_3)_3CO$, $(CF_3)_2(CH_3)CO$, $(CF_3)(CH_3)_2CO$, PhO (phenoxy), MeO (methoxy), EtO (ethoxy), tosylate (p-$CH_3$—$C_6H_4$—$SO_3$), mesylate (2,4,6-trimethylphenyl) or $CF_3SO_3$ (trifluoromethanesulphonate).

17. The process according to according to claim 1 or 5, wherein a catalyst of the general formula (B1) is used,

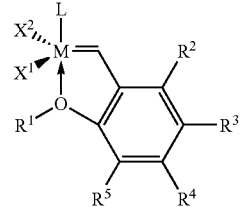
(B1)

where

M is ruthenium or osmium, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radical which may in each case optionally be substituted by one or more alkyl, halogen, alkoxy, aryl or heteroaryl radicals, $R^2$, $R^3$, $R^4$ and $R^5$ are identical or different and are each hydrogen or an organic or inorganic radical, L is a ligand, is used.

18. The process according to claim 17, wherein a catalyst of the general formula (B1) is used in which M is ruthenium, $X^1$ and $X^2$ are both halogen, in particular chlorine, $R^1$ is a straight-chain or branched $C_1$-$C_{12}$-alkyl radical, $R^2$, $R^3$, $R^4$ and $R^5$ are identical or different and are each hydrogen or an organic or inorganic radical, L is a ligand.

19. The process according to claim 17, wherein a catalyst of the general formula (B1) is used in which M is ruthenium, $X^1$ and $X^2$ are both chlorine, $R^1$ is an isopropyl radical, $R^2$, $R^3$, $R^4$, $R^5$ are all hydrogen and L is a substituted or unsubstituted imidazolidine radical of the formula (IIa) or (IIb)

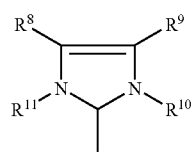
(IIa)

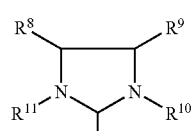
(IIb)

where $R^8$, $R^9$, $R^{10}$, $R^{11}$ are identical or different and are each hydrogen, straight-chain or branched $C_1$-$C_{30}$-alkyl, $C_3$-$C_{20}$-cycloalkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_6$-$C_{24}$-arylthio, $C_1$-$C_{20}$-alkylsulphonyl, $C_1$-$C_{20}$-alkylsulphonate, $C_6$-$C_{24}$-arylsulphonate or $C_1$-$C_{20}$-alkylsulphynyl.

20. The process according to claim 17, wherein a catalyst of the structure (VII), (VIII), (IX), (X), (XI), (XII), (XIII), (XIV) or (XV), where Mes is in each case 2,4,6-trimethylphenyl, is used as catalyst of the general structural formula (B1)

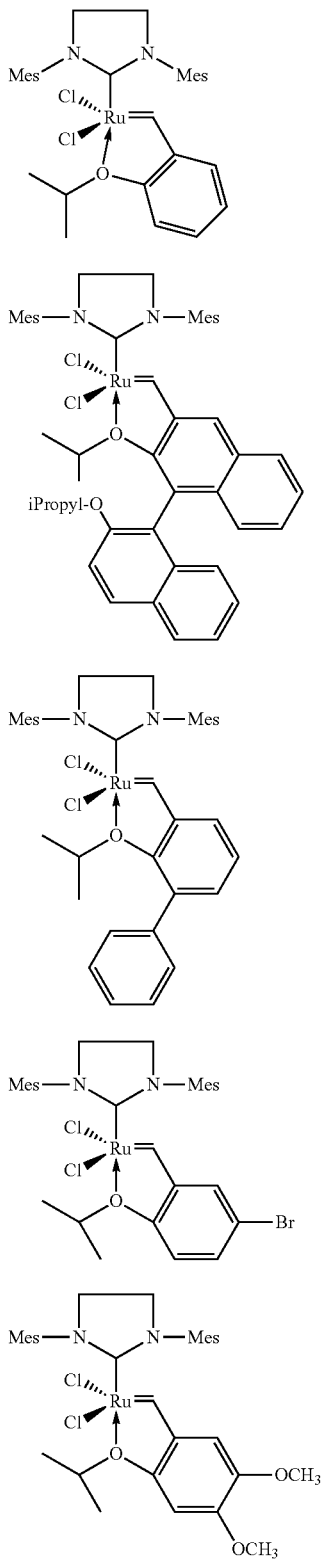

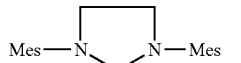

(XII)

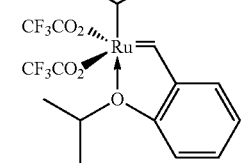

(XIII)

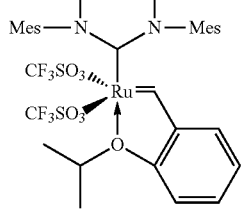

(XIV)

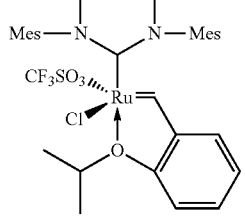

(XV)

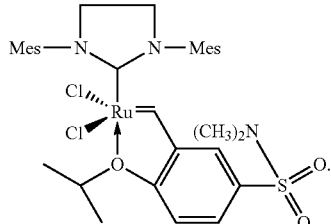

21. The process according to claim 1 or 5, wherein a catalyst of the general formula (B2), $$\text{(B2)}$$

where

M is ruthenium or osmium, $X^1$ and $X^2$ are identical or different ligands, $R^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radical which may in each case optionally be substituted by one or more alkyl, halogen, alkoxy, aryl or heteroaryl radicals, $R^6$ is hydrogen or an alkyl, alkenyl, alkynyl or aryl radical and L is a P(R$^7$)$_3$ radical, where the radicals R$^7$ are each, independently of one another, C$_1$-C$_6$-alkyl, C$_3$-C$_8$-cycloalkyl or aryl, or else a substituted or unsubstituted imidazolidine radical ("Im"), the radicals R$^{12}$ are identical or different and are each an organic or inorganic radical, n is 0, 1, 2 or 3, is used.

22. The process according to claim 21, wherein a catalyst of the structure (XVI) or (XVII), where Mes is in each case 2,4,6-trimethylphenyl, is used

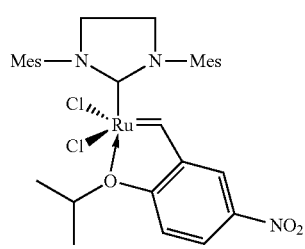

(XVI)

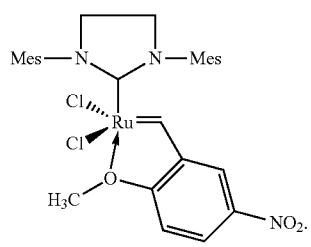

(XVII)

23. The process according to claim 1 or 5, wherein a catalyst of the general formula (B3) is used,

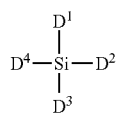

(B3)

where D$^1$, D$^2$, D$^3$ and D$^4$ each have a structure of the general formula (XVIII) shown below which is bound via the methylene group shown at right to the silicon of the formula (B3),

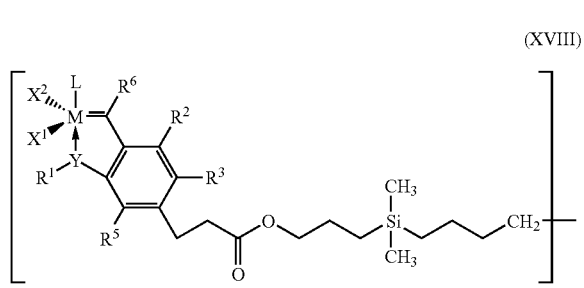

(XVIII)

where

M is ruthenium or osmium,

X$^1$ and X$^2$ are identical or different ligands,

R$^1$ is an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulphonyl or alkylsulphynyl radical which may in each case optionally be substituted by one or more alkyl, halogen, alkoxy, aryl or heteroaryl radicals, R$^2$, R$^3$, R$^4$ and R$^5$ are identical or different and are each hydrogen or an organic or inorganic radical, R$^6$ is hydrogen or an alkyl, alkenyl, alkynyl or aryl radical and L is a ligand.

24. The process according to claim 1 or 5, wherein a catalyst of the general formula (B4) is used,

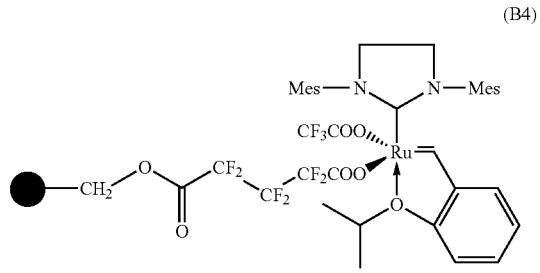

(B4)

wherein the symbol ● represents a support.

25. The process according to claim 1 or 5, wherein a catalyst of the general formula (C) is used,

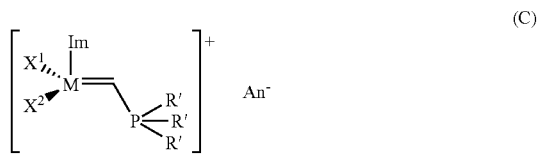

(C)

where

M is ruthenium or osmium,

X$^1$ and X$^2$ are identical or different and are anionic ligands,

R' are identical or different and are organic radicals,

Im is a substituted or unsubstituted imidazolidine radical and

An is an anion.

26. The process according claim 1 or 5, wherein a catalyst of the general formula (D) is used,

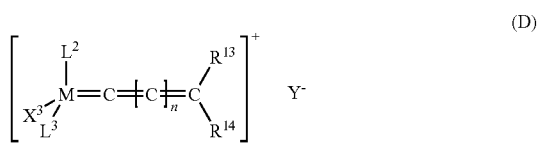

(D)

where

M is ruthenium or osmium,

R$^{13}$ and R$^{14}$ are each, independently of one another, hydrogen, C$_1$-C$_{20}$-alkyl, C$_2$-C$_{20}$-alkenyl, C$_2$-C$_{20}$-alkynyl, C$_6$-C$_{24}$-aryl, C$_1$-C$_{20}$-carboxylate, C$_1$-C$_{20}$-alkoxy, C$_2$-C$_{20}$-alkenyloxy, C$_2$-C$_{20}$-alkynyloxy, C$_6$-C$_{24}$-aryloxy, C$_2$-C$_{20}$-alkoxycarbonyl, C$_1$-C$_{20}$-alkylthio, C$_1$-C$_{20}$-alkylsulphonyl or C$_1$-C$_{20}$-alkylsulphynyl, X$^3$ is an anionic ligand, L$^2$ is an uncharged p-bonded ligand which may either be monocyclic or polycyclic, $L^3$ is a ligand selected from the group consisting of phosphines, sulphonated phosphines, fluorinated phosphines, functionalized phosphines having up to three aminoalkyl, ammonioalkyl, alkoxyalkyl, alkoxycarbonylalkyl, hydrocarbonylalkyl, hydroxyalkyl or ketoalkyl groups, phosphites, phosphinites, phosphonites, phosphinamines, arsines stibines, ethers, amines, amides, imines, sulphoxides, thioethers and pyridines, $Y^-$ is a noncoordinating anion and n is 0, 1, 2, 3, 4 or 5.

27. The process according to claim 1 or 5, wherein a catalyst of the general formula (E) is used,

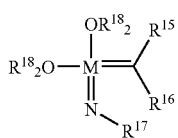

where $M^2$ is molybdenum or tungsten, $R^{15}$ and $R^{16}$ are identical or different and are each hydrogen, $C_1$-$C_{20}$-alkyl, $C_2$-$C_{20}$-alkenyl, $C_2$-$C_{20}$-alkynyl, $C_6$-$C_{24}$-aryl, $C_1$-$C_{20}$-carboxylate, $C_1$-$C_{20}$-alkoxy, $C_2$-$C_{20}$-alkenyloxy, $C_2$-$C_{20}$-alkynyloxy, $C_6$-$C_{24}$-aryloxy, $C_2$-$C_{20}$-alkoxycarbonyl, $C_1$-$C_{20}$-alkylthio, $C_1$-$C_{20}$-alkylsulphonyl or $C_1$-$C_{20}$-alkylsulphynyl, $R^{17}$ and $R^{18}$ are identical or different and are each a substituted or halogen-substituted $C_1$-$C_{20}$-alkyl, $C_6$-$C_{24}$-aryl, $C_6$-$C_{30}$-aralkyl radical or a silicone-containing analogue thereof.

28. The process according to claim 1 or 5, wherein a catalyst of the general formula (F) is used,

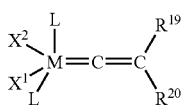

where

M is ruthenium or osmium, $X^1$ and $X^2$ are identical or different and are anionic ligands which can have all meanings of $X^1$ and $X^2$ in the general formulae (A) and (B), the symbols L represent identical or different ligands which can have all meanings of L in the general formulae (A) and (B), and $R^{19}$ and $R^{20}$ are identical or different and are each hydrogen or substituted or unsubstituted alkyl.

29. The process according to claim 1 or 5, wherein a catalyst of the general formula (G), (H) or (K) is used,

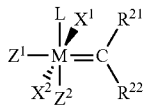

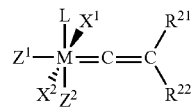

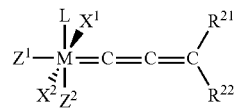

where

M is osmium or ruthenium, $X^1$ and $X^2$ are identical or different and are two ligands, preferably anionic ligands, L is a ligand, preferably an uncharged electron donor, $Z^1$ and $Z^2$ are identical or different and are uncharged electron donors, $R^{21}$ and $R^{22}$ are each, independently of one another, hydrogen alkyl, cycloalkyl, alkenyl, alkynyl, aryl, carboxylate, alkoxy, alkenyloxy, alkynyloxy, aryloxy, alkoxycarbonyl, alkylamino, alkylthio, alkylsulphonyl or alkylsulphynyl which may in each case optionally be substituted by one or more radicals selected from among alkyl, halogen, alkoxy, aryl or heteroaryl.

30. The process according to claim 1, wherein the metathesis catalyst and the compound of the general formula (I) are used in a molar ratio of metathesis catalyst to compound of the general formula (I) of from 1:1000 to 1:1.

31. The process according to claim 30, wherein the metathesis catalyst and the compound of the general formula (I) are used in a molar ratio of metathesis catalyst to compound of the general formula (I) of from 1:25 to 1:1.

32. The process according to claim 1, wherein the compound of the general formula (I) is used in an amount based on the nitrile rubber in the range from 0.0005 phr to 5 phr (phr=parts by weight per 100 parts by weight of rubber).

33. The process according to claim 32, wherein the compound of the general formula (I) is used in an amount based on the nitrile rubber in the range from 0.005 phr to 2.5 phr (phr=parts by weight per 100 parts by weight of rubber).

34. The process according to claim 1, wherein the catalyst is used in such an amount that from 1 to 1000 ppm of noble metal based on the nitrile rubber used, are used.

35. The process according to claim 34, wherein the catalyst is used in such an amount that from 2 to 500 ppm, based on the nitrile rubber used, are used.

36. The process according to of claim 1, comprising that the process for reducing the molecular weight of nitrile rubber is followed by a hydrogenation of the nitrile rubber.

37. The process according to claim 6, wherein L are identical or different uncharged electron donors.

38. The process according to claim 6, wherein $X^1$ and $X^2$ are identical or different and are two anionic ligands.

* * * * *